United States Patent [19]

Simciak et al.

[11] Patent Number: 5,793,967

[45] Date of Patent: Aug. 11, 1998

[54] DATA COLLECTION AND RF COMMUNICATIONS SYSTEM AND METHOD OF DEVELOPING APPLICATIONS FOR SAME

[75] Inventors: Walter C. Simciak, Winston-Salem; Raymond Andrew Orr, Charlotte, both of N.C.; Lieb A. Lurie, Troy, Ohio

[73] Assignee: Hand Held Products, Inc., Charlotte, N.C.

[21] Appl. No.: 491,309

[22] Filed: Jun. 16, 1995

Related U.S. Application Data

[63] Continuation-in-part of Ser. No. 324,980, Oct. 18, 1994, Pat. No. 5,659,761.

[51] Int. Cl.[6] .................................................. G06F 15/16
[52] U.S. Cl. ........................... 395/200.34; 395/200.47; 395/750.03
[58] Field of Search .................. 395/200.04, 200.34, 395/200.47, 200.54, 200.6, 750.03

[56] References Cited

U.S. PATENT DOCUMENTS

| | | | |
|---|---|---|---|
| 4,143,417 | 3/1979 | Wald et al. | 364/900 |
| 4,160,156 | 7/1979 | Sherer | 235/463 |
| 4,317,181 | 2/1982 | Teza et al. | 364/707 |
| 4,365,290 | 12/1982 | Nelms et al. | 364/200 |
| 4,521,678 | 6/1985 | Winter | 235/472 |
| 4,850,009 | 7/1989 | Zook et al. | 379/96 |
| 5,021,679 | 6/1991 | Fairbanks et al. | 307/66 |
| 5,167,024 | 11/1992 | Smith et al. | 395/375 |
| 5,182,810 | 1/1993 | Bartling et al. | 395/750 |
| 5,189,291 | 2/1993 | Siemiatkowski | 235/472 |
| 5,231,273 | 7/1993 | Caswell et al. | 235/385 |
| 5,280,162 | 1/1994 | Marwin | 235/462 |
| 5,283,905 | 2/1994 | Saadeh et al. | 395/750 |
| 5,331,136 | 7/1994 | Koenck et al. | 235/375 |
| 5,608,872 | 3/1997 | Schwartz et al. | 395/200.04 |

FOREIGN PATENT DOCUMENTS

| | | |
|---|---|---|
| 2196766 | 5/1988 | United Kingdom. |
| WO93/25955 | 12/1993 | WIPO. |
| WO94/12938 | 6/1994 | WIPO. |

Primary Examiner—Jack B. Harvey
Assistant Examiner—Jigar Pancholi
Attorney, Agent, or Firm—Bell Seltzer Intellectual Property Group of Alston & Bird LLP

[57] ABSTRACT

A RF data communications system for remotely collecting data and a method of developing applications for such a system are provided. The RF data communications system preferably has a first computer including at least a first microprocessor, a first screen display, and a first data screen file positioned representing a first predetermined screen display format. A first RF data transceiver is positioned in electrical communication with the first microprocessor of the first computer for transmitting and receiving RF data, and a second RF data transceiver is positioned remote from the first RF data transceiver and the first computer for transmitting RF data to and receiving RF data from the first RF data transceiver. A second computer is positioned in electrical communication with the second RF data transceiver and remote from the first computer. The second computer preferably is arranged for collecting data remote from the first computer and includes at least a data sensor, a second microprocessor, a second screen display, and a second data screen file representing a second predetermined screen display format. The second screen data file substantially corresponds to the first data screen file so that the second screen display format substantially corresponds to the first screen display format and so that modifications to the first data screen file are responsively made to the second data screen file and responsively displayed on the second screen display to a user thereof.

27 Claims, 14 Drawing Sheets

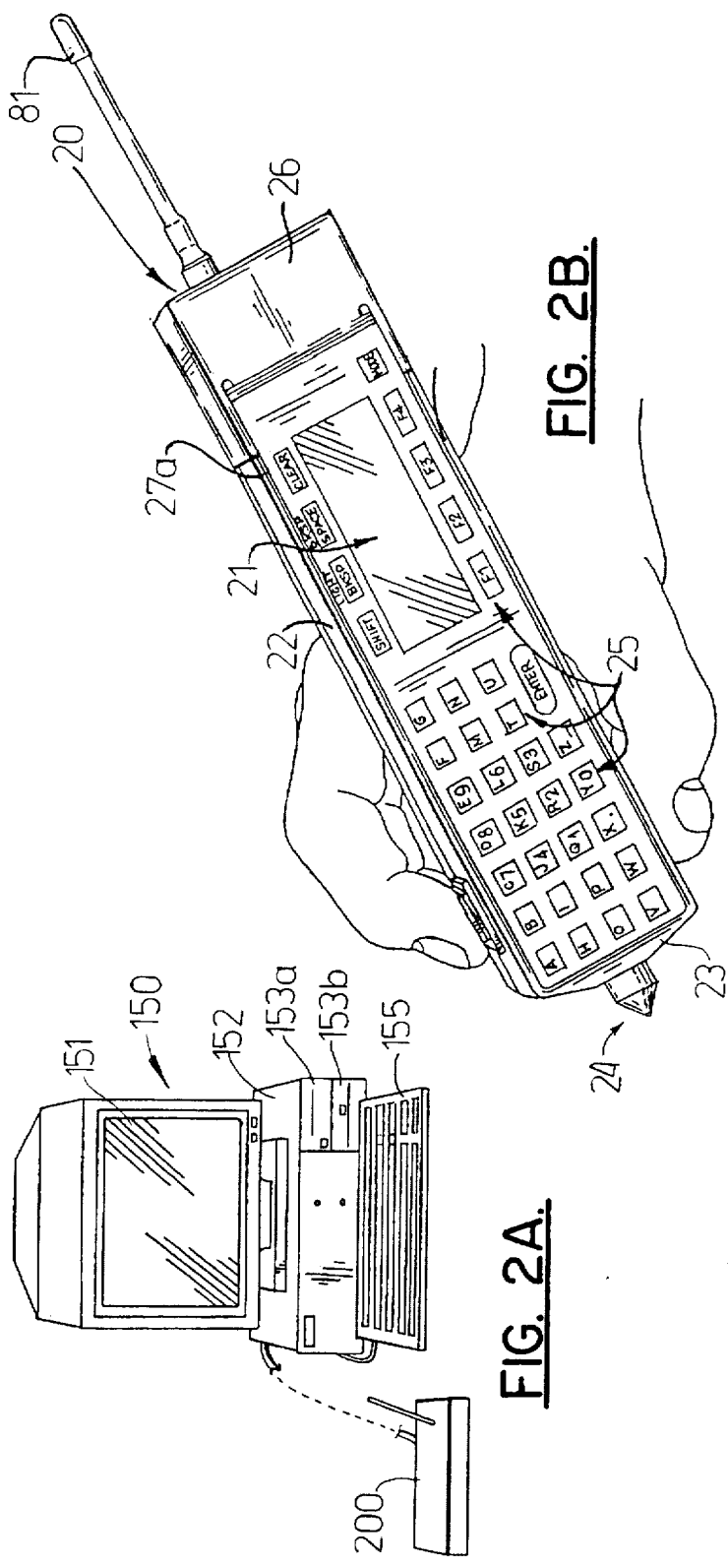
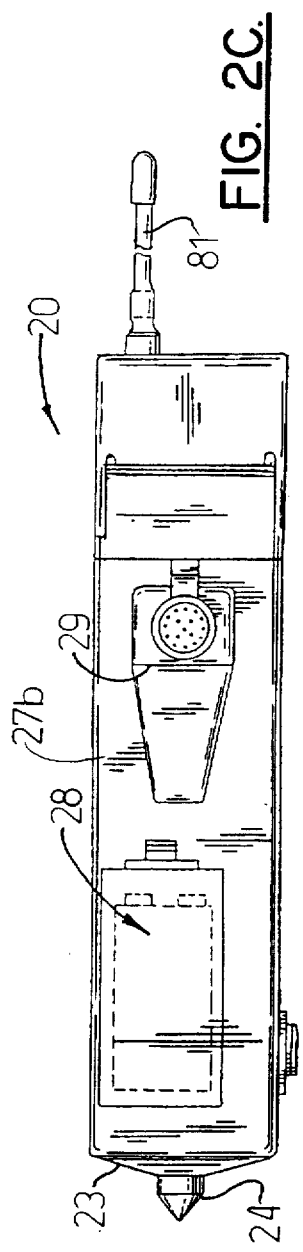
FIG. 2A.
FIG. 2B.
FIG. 2C.

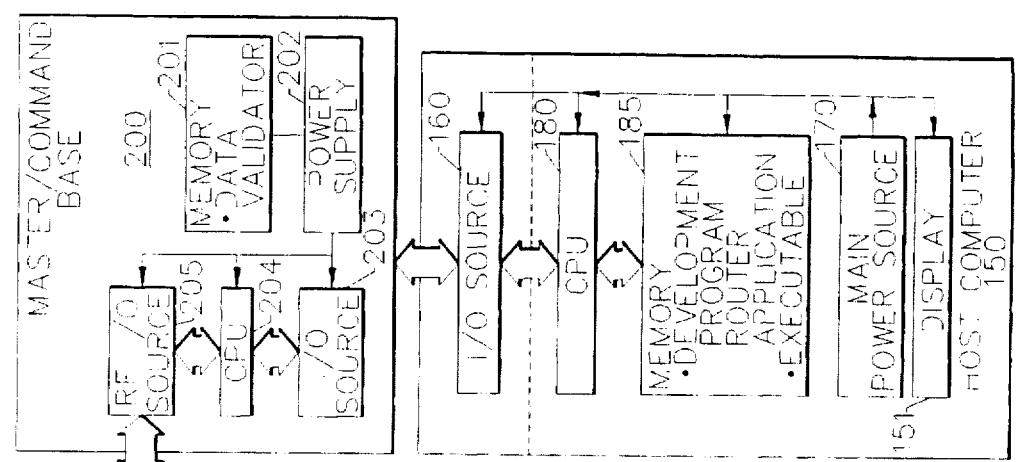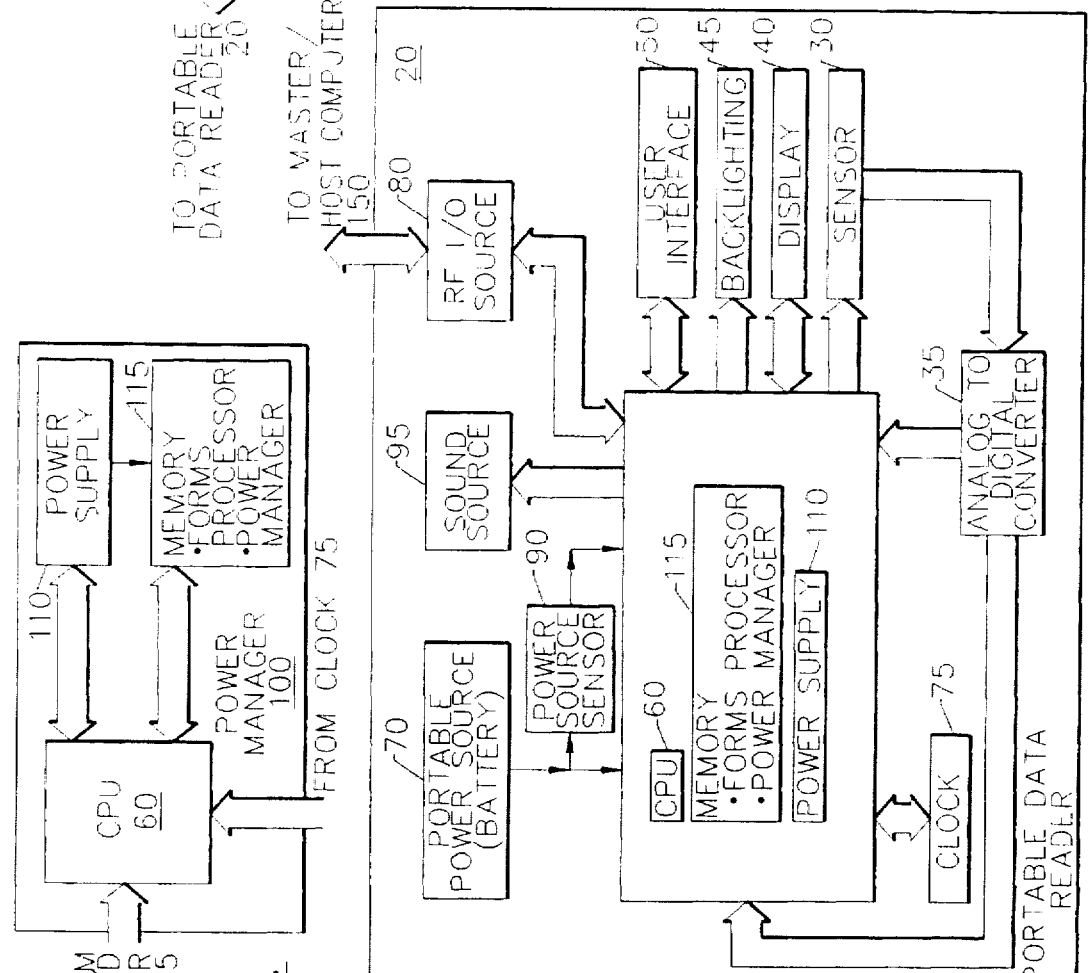
FIG. 3B.
FIG. 3A.

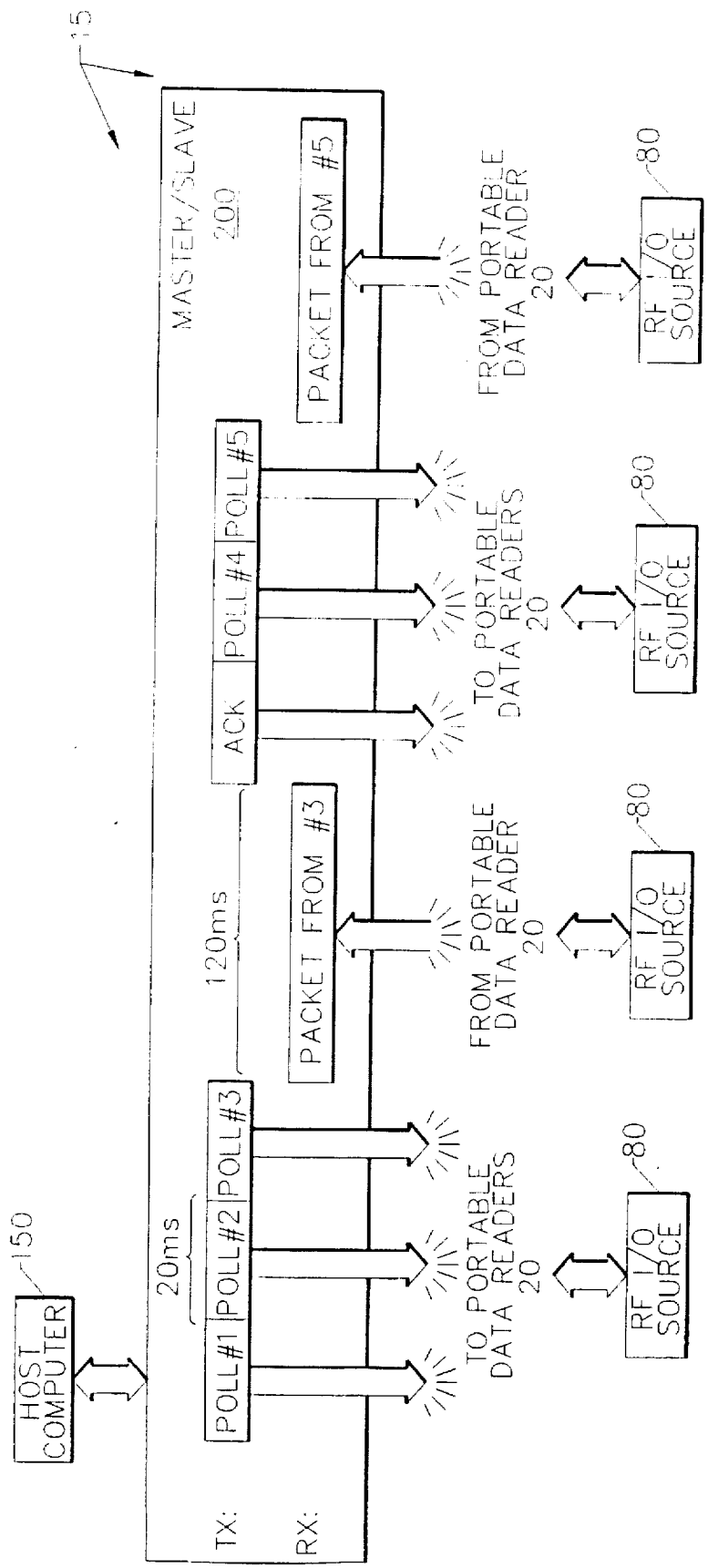

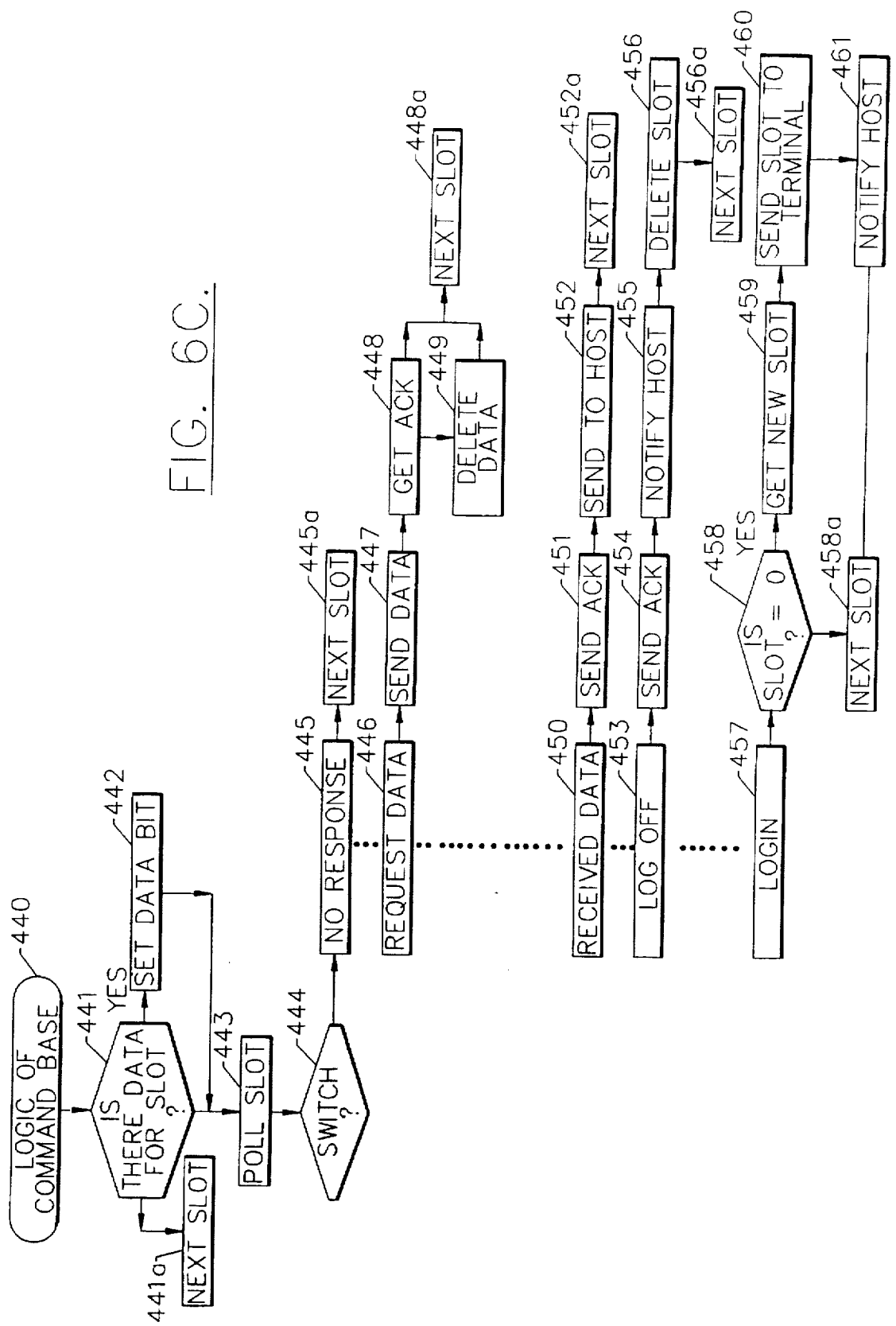

DATA COLLECTION AND RF COMMUNICATIONS SYSTEM AND METHOD OF DEVELOPING APPLICATIONS FOR SAME

RELATED APPLICATION

This application is a continuation-in-part of U.S. patent application Ser. No. 08/324,980 filed on Oct. 18, 1994, now U.S. Pat. No. 5,659,761 which is hereby incorporated herein in its entirety by reference.

FIELD OF THE INVENTION

This invention relates to a data recognition apparatus and methods and more particularly to a radio frequency ("RF") communications system having a portable data recognition apparatus.

BACKGROUND OF THE INVENTION

Various systems and methods of data recognition are known to those skilled in the art, including portable systems for sensing and decoding data. Examples of such systems may be seen in U.S. Pat. No. 4,143,417 titled "*Portable Data-Gathering Apparatus Formed by Modular Components Having Operate-Standby Modes*" by Wald et al.; U.S. Pat. No. 4,521,678 titled "*Battery-Powered Optical Bar Code Reader and Voltage Regulator Therefor*" by Winter; U.S. Pat. No. 4,160,156 titled "*Method and Apparatus for Reading Bar Coded Data Wherein the Light Source is Periodically Energized*" by Sherer; and U.S. Pat. No. 5,189,291 titled "*Bar Code Reader Operable as Remote Scanner or with Fixed Terminal*" by Siemiatkowski. Portable systems have been used for data collection in a broad range of operations, including inventory control in manufacturing and retail stores and tracking of packages or cargo in the delivery industry. Portable optical reading units are typically battery powered or attached to a terminal station or computer which supplies a power source.

Various codes have been produced, and printed on products or containers, to increase the accuracy of such data collection systems. One such code is a "bar code" which may be read by passing an optical sensing unit over the bar code on the product or by passing the product over the optical sensing unit. A bar code typically consists of a pattern of black and white bars of varying widths, with the encoded information determined by the sequence of these varying width bars. Bars are scanned by the optical sensing unit and the widths of the bars are then translated into a specific identifying sequence for that particular item.

When these data collection systems are used in industry, for example, in many applications there is a need to communicate between a main or host computer and one or more remote portable data collection devices such as in an inventory control application. In some data collection systems, an administrator or an application programmer may be positioned in a main office in a warehouse and communicate to a plurality of remote data collection users. These types of communications often occur through RF data communications primarily because of the data transfer benefits of RF-type communications, e.g., little or no hardwire cabling connections, ease of maneuverability through data collection areas.

Conventional RF data communication systems for collecting data, however, are expensive, complex, and often require a relatively large amount of power for operating the remote data collection devices. These conventional RF data collection systems are also often custom designed for specific industry applications, for large warehousing operations, i.e., large square foot coverage, for large numbers of users, for a high number of transactions within a relatively short time period, and for other "heavy" use applications. These conventional heavy-use systems, however, are often over developed and too expensive for many "light" use applications in the industry where these high coverage area, large number of users, high transaction rates are not needed.

Additionally, for example, when a data collection application for such a heavy-use system changes, the user of the system then either has to make major custom programming changes to the RF data collection system or buy another customized system for the new application. Both of these approaches are expensive, time consuming, and often involve a significant amount of "down-time," i.e., when the data collection capabilities of a remote data collection device cannot be used because of the changes occurring with the data collection application.

OBJECTS AND SUMMARY OF THE INVENTION

It is therefore an object of the present invention to provide a data collection and RF data communications system which can more easily be modified for changes in user applications.

It is also an object of the present invention to provide a less expensive and less complex data collection and RF data communications system for applications where large warehousing operations, a large numbers of users, and a high number of transactions within a relatively short time period are not needed.

It is another object of the present invention to provide a less expensive and less time consuming method of developing applications for a data collection and RF data communications system having one or more remote data collection devices.

It is a further object of the present invention to provide a data collection and RF data communications system including a portable data reader adaptable for various user applications and having extended use without a requirement of replacing or recharging a portable power source connected thereto.

The present invention is primarily directed to a data collection and RF data communications system where large warehousing operations, large numbers of users, and high numbers of transactions within a relatively short time period are not needed, i.e., "light" use, or as a supplement to a conventional customized RF data communication systems. The present invention recognizes that many RF data communications systems are needed where a large square foot coverage is not necessarily required. Also, many systems only require a low number of users and only require relatively low transactions rates. Because the conventional systems are expensive, complex, and require extensive customizing of applications, the present invention provides a less expensive, a less complex, and a relatively easier method of developing applications by users of a data collection and RF data communications system.

These and other objects of the present invention are provided by a radio frequency ("RF") data communications system for collecting data from a remote data collection device. The RF data communications system preferably has a first computer including at least a first processor for processing data, a first screen display positioned in electrical communication with the first processor for displaying processed data, and a first data screen file positioned in electrical communication with the first processor and representing a first predetermined screen display format having a plurality of predetermined data fields. A first RF data transceiver preferably is positioned in electrical communication with the first processor of the first computer for transmitting and receiving RF data. A second RF data transceiver is positioned remote from the first RF data transceiver and the first computer for transmitting RF data to and receiving RF data from the first RF data transceiver. A second computer, preferably a remote portable data reader, is positioned in electrical communication with the second RF data transceiver and remote from the first computer. The second computer is preferably arranged for collecting data remote from the first computer and includes at least a data sensor positioned for sensing data, a second processor positioned in electrical communication with the data sensor for processing sensed data, a second screen display positioned in electrical communication with the second processor for displaying sensed data, and a second data screen file positioned in electrical communication with the second processor and representing a second predetermined screen display format having a plurality of predetermined data fields. The second screen data file substantially corresponds to the first data screen file so that the second screen display format substantially corresponds to the first screen display format and so that modifications to the first data screen file are responsively made to the second data screen file and responsively displayed on the second screen display in the first screen display format of the second computer.

The present invention also provides a method of developing an RF data collection application. The method preferably includes providing a first computer including a first screen display for displaying data and a first data screen file positioned in electrical communication with the first screen display. The first data screen file preferably represents a first predetermined screen display format having a plurality of predetermined data fields. The first data screen file is then modified so that the first data screen file responsively modifies the first data screen format. A second computer is preferably provided and positioned remote from and in RF communication with the first computer. The second computer is arranged for collecting data remote from the first computer and preferably includes a data sensor for sensing data, a second screen display for displaying sensed data, and a second data screen file positioned in electrical communication with the second screen display and representing a second predetermined screen display format having a plurality of predetermined data fields. The second data screen file preferably substantially corresponds to the first data screen file. The modifications made to the first data screen file are transmitted to the second computer by RF communications. The second computer receives the modifications made to the first data screen file from the first computer and preferably modifies the second screen file responsive to the modifications received by the second computer so that the modifications made to the first data screen file are correspondingly and responsively displayed on the second screen display. The method preferably further includes sensing data by the data sensor, or as entered through a user interface, of the second computer, displaying the sensed data on the second screen display in at least one of the plurality of data fields of the second computer, and correspondingly displaying the sensed data on the first screen display in at least a corresponding one of the plurality of data fields of the first computer so that the sensed data advantageously appears as if entered directed by the first computer.

Therefore, because conventional heavy-use systems many times are over developed and too expensive for many of the light-use applications in the industry, the system and method of the present system addresses this problem. By providing a data collection and RF data communications system which is directed primarily to relatively light-use applications and which is relatively easy to program and modify by system users' for various applications, the present invention also advantageously saves users time and expense over these conventional heavy-use systems. The modified or new data collection applications developed for the system of the present invention preferably provides the change to a display screen format of a remote data collection device so that data collection and the remote screen display format preferably appear in real time during use and advantageously may be relatively transparent to the user thereof.

BRIEF DESCRIPTION OF THE DRAWINGS

Some of the objects and advantages of the present invention having been stated, others will be more fully understood from the detailed description that follows, and by reference to the accompanying drawings in which:

FIG. 2A illustrates a front perspective view of a master/command base station connected to a host computer of a data collection and RF data communications system according to the present invention;

FIG. 2B illustrates a front perspective view of a portable data reader positioned in a hand of a user of a data collection and RF data communications system according to the present invention;

FIG. 2C illustrates a back elevational view of a portable data reader of a data collection and RP data communications system according to the present invention;

FIG. 3A schematically illustrates a portable data reader, a master/command base station, and a host computer of a data collection and RF data communication system according to the present invention;

FIG. 3B schematically illustrates a forms processor and a power manager of a portable data reader of a data collection and RF data communication system according to the present invention;

FIG. 5 schematically illustrates input/output source polling of a data collection and RF data communications system including a plurality of portable data readers according to the present invention;

FIGS. 6C–6E schematically illustrate a flow diagram of a communications sequence of a data collection and RF data communications system, including a portable data reader, according to a second method of data communications of the present invention.

DETAILED DESCRIPTION

The present invention will now be described more fully hereinafter with reference to the accompanying drawings in which preferred embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

As best illustrated in FIGS. 1, 2A–2C, and 5, a data collection and RF data communications system 15 according to the present invention preferably includes a first main host computer 150, preferably a personal computer as illustrated in FIG. 2A, a master or command base RF communication station 200 electrically connected to the host computer 150, and one or more, i.e., a plurality, of second portable remote computers, preferably an RF portable data reader 20, that communicate with the host computer 150 primarily through the master RF communication station 200.

Figure 1:
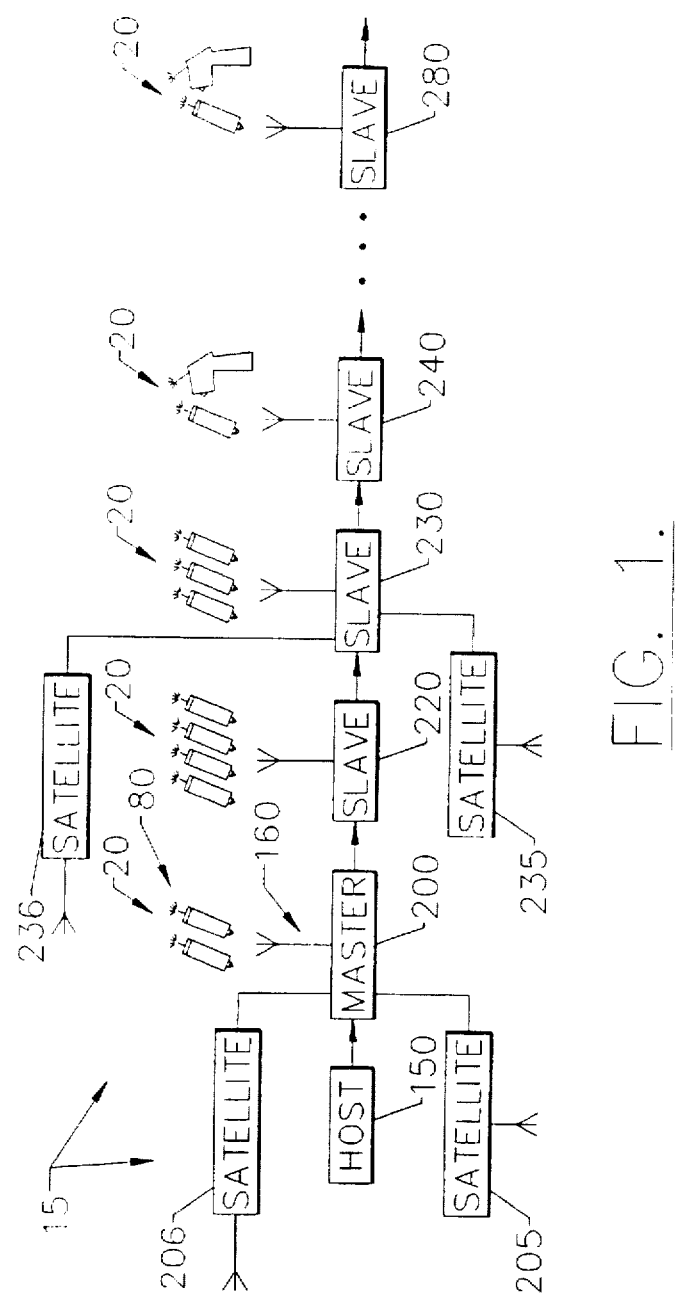
FIG. 1 schematically illustrates a data collection and RF data communications system according to the present invention.

This embodiment of the present invention in FIG. 1 illustrates a plurality of communication stations 200, 220, 230, 240, 280 that communicate with a plurality of portable data readers 20 in a network configuration. The host computer 150 may be any type of computer or device preferably capable of communicating via an RS-232 or RS-485 asynchronous link one or more of these communication stations 200, 220, 230, 240, 280. It will also be understood by those skilled in the art that a communication station such as the master station 200 may be built or arranged integral with a host computer or the like. The master communication station 200, a plurality of slave communication stations 220, 230, 240, 280, and a plurality of satellite stations 205–206, 225–226 illustrated also are preferably RF communication stations. The one master station 200, for example, may be connected to as many as 255 slave stations. The master station 200 and the host computer 150 preferably communicate via the RS-232 or RS-485 link.

The master station's 200 communication link with the host computer 150 is preferably separate from the other slave station 220, 230, 240, 280 communication ports so as not to conflict with the slave station-to-slave station communications. Communication speed and protocol may also be separately determined by the application of the data collection and RF data communications system 15. The master station 200 and the slave stations 220, 230, 240, 280 preferably have a daisy-chain configuration via a four wire, i.e., two pair, RS-485 port. The slave stations 220, 230, 240, 280 and satellite stations 205, 206 preferably also receive AC power through additional wire(s) in the same cable which allows the slave stations 220, 230, 240, 280 and satellite stations 205, 206 to be positioned where otherwise it might be cumbersome and/or expensive. The host computer's 150 main functions are to provide a database and memory capable files for various software and hardware functions, to process data received from the master station 200, to control data communications on the RS-485 network, to administer and monitor various user applications, and to modify, i.e., including converting applications to RF format, and develop applications as desired.

The slave station's 220, 230, 240, 280 function, on the other hand, is to provide a cell for RF coverage to a particular work area or the like. The slave stations 220, 230, 240, 280 preferably are programmed in C-language, UDL-language, or Visual Basic (a registered trademark of Microsoft Corp.) development software in a stored software program. These programs preferably use the same development system as the portable data readers 20 and are uploaded via the RS-232 or RS-485 communication ports. Each slave 220, 230, 240, 280 preferably has a unique one byte identifying number which is assigned by the master station 200 when the slave station 220, 230, 240, 280 initiates communication.

In operation, for example, the master station 200 can either poll or directly receive data from the satellite stations 205, 206 and/or slave stations 220, 230, 240, 280. Additionally, an identifying number transmitted by the master station 200 may be in the form of a complete data packet. The portable data reader 20 preferably transmits the data directly to the master station 200 where it can be validated, checked, or sequenced prior to forwarding to the host computer 150. Communications between the master station 200 and the satellites 205, 206 and/or slaves 220, 230, 240, 280 then continues until all required transactions are concluded at which time the stations return to direct communication via a wait-and-listen type scheme as understood by those skilled in the art, or the master station 200 may initiate a polling type scheme as well.

Due to the characteristics of the radio architecture, transmission, or encoding, preferably using amplitude modulation ("AM"), when a signal or data packet from the first computer 150 which is transmitted to the second computer or portable data reader 20 from the master station 200, the signal or data packet is simultaneously transmitted, i.e., "simulcast," via RF from the master station 200 and its connected satellites 205, 206 and/or its connected slaves 220, 230, 240, 280, because of inherent advantages of AM, such that the second computer 20 can receive the signal anywhere within the RF range or coverage area of the master and/or satellites 205, 206 and slaves 220, 230, 240, 280 if needed. This eliminates the complex architecture for message handling that are employed by conventional systems which disadvantageously require one base station to transmit at a time and the logical determination of which one to transmit.

The portable data reader 20 preferably has a transmitting and receiving means, i.e., a RF data transceiver, 80 which includes polling means responsive to a power manager 100 and a second transmitting and receiving means 160 for polling the second transmitting and receiving means 160 and determining whether other data from a second portable data reader 20 is being transmitted thereto (see FIG. 5). In operation, all master 200 and slave 220, 230, 240, 280 stations preferably are continuously polling the portable data readers 20 for data transmissions therefrom. Data is preferably transferred using an asynchronous format. When a packet is received from a portable data reader 20, this data will be sent to the master station 200 along with the strength or a data validation routine/program of the transmission signal. If a plurality of communication stations receive the same packet, the master station 200 preferably uses the signal strength to determined which base first responds. If any station, i.e., slave station 220 or satellite station 205, is unable to get a response back from the portable data reader 20 that sent the data packet, then all stations, i.e., slave stations 220, 230, 240, 280 and satellite stations 205, 206, that received the packet, attempt to reestablish communications and subsequently retransmit data.

In addition, all slave stations 220, 230, 240, 280 may use a listen-before-transmit protocol to prevent interrupting a portable data reader 20 transmission. Preferably, under most circumstances, two or more slave stations 220, 230, 240, 280 or satellite stations 205, 206 may transmit at the same time to improve efficiency where needed. As understood by those skilled in the art, this also may be incorporated into the communication protocol. The protocol for the data communication apparatus 15 is preferably an inquiry based slotted response scheme. A plurality of data readers 20 are preferably polled at one time and provided with a common time slot for response. The number of slots and the delay times for each slot may be determined depending on the application of the user.

As further illustrated in FIG. 5, to reduce the occurrence of two or more data readers 20 transmitting at the same time, each data reader 20 is also preferably assigned an identifying number when it initiates communication. When there is no traffic on the RF network, each master 200 or slave station 220, 230, 240, 280 continuously polls for each data reader 20 by transmitting a relatively short, i.e., about 8 milliseconds (ms) tone at a predetermined frequency, i.e., 14,400 Hz, followed by a short data word consisting of the identifying number of the data reader 20 being polled and several status bits, all of which preferably occupies a short amount, i.e., about 2.5 ms, of time.

The master 200 and slave station(s) 220, 230, 240, 280 then listen for about 10 ms to receive a reply message from the data reader 20. The portable data readers 20 listens for this specific tone and their identifying number prior to any transmission. Following a transmission, the data reader 20 listens for an acknowledgment or non-acknowledgment from the host computer 150. If neither is received, the data reader 20 waits to be polled again before reattempting the communication. Acknowledgment preferably occurs between the portable data reader 20 and the master 200 or slave station 220, 230, 240, 280 to verify communication therewith.

The identifying number byte preferably has eight (8) bits of data, and four (4) bits of forward error correction. The first three bits of data preferably contain information on pending messages for the portable data readers 20. The last five bits of data preferably contain the identifying number. Each polling packet sent by the master 200 or slave station 220, 230, 240, 280 preferably requires about 21 ms of time if no response is heard, i.e., 8 ms of tone, 2.5 ms of data, and 10 ms of waiting for a reply to start. Preferably, a maximum of 32 discrete identifying numbers, i.e., 0–31, are polled. This takes about 672 ms to poll the entire list if no answers occur. If more than 32 portable data readers 20 are communicating in the network, then the readers 20 responds based on the low five (5) bits of their identifying number. This may lead to the possibility of a collision.

When a data reader 20 with an identifying number greater than or equal to 32 fails to receive an acknowledgement or non-acknowledgment, it skips identifying number 32 of its poll packets before reattempting the communication. For example, data reader numbers 2, 34, and 66 all attempt to transmit a packet when identifying number 2 is polled. The master 200 or slave station 220, 230, 240, 280 does not see valid data and so does not reply, but continues polling. Data reader number 2 transmits at the second identifying number, and data reader number 66 transmits at the third.

As understood by those skilled in the art, the portable data reader 20 and the master 200 and slave stations 220, 230, 240, 280 preferably use Manchester encoding for all transmissions. Each transmission is preferably preceded by a synchronous pattern to establish timing, i.e., to both clear the transceiver 80 of the portable data reader 20 and maintain a zero voltage DC at the internal receiver comparison circuitry. The master 200 or slave station 220, 230, 240, 280 preferably holds the information, reformats it as necessary, and communicates with the host computer 150 according to the host wire line protocol.

Figure 6A:
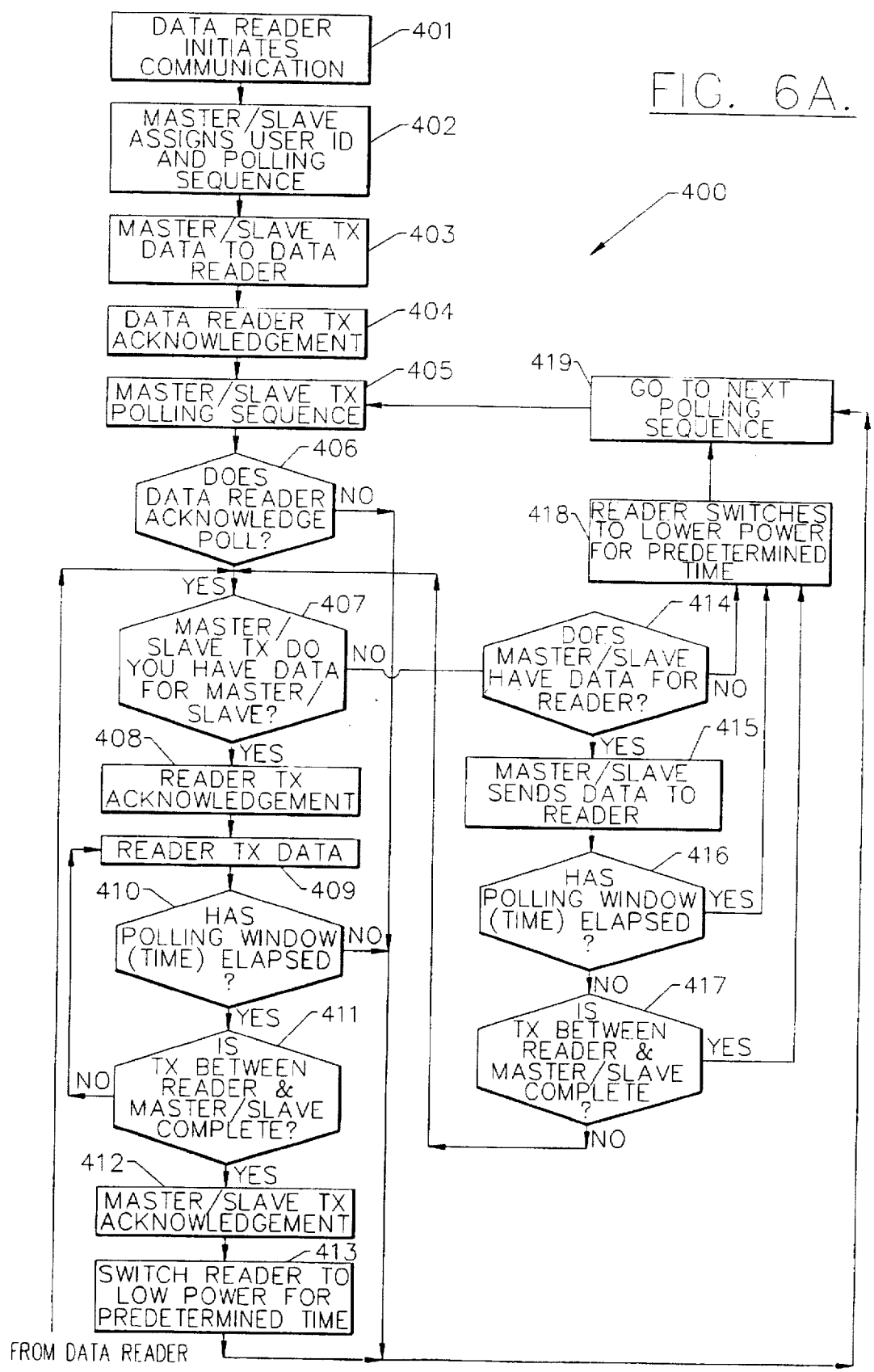
FIGS. 6A–6B schematically illustrate a flow diagram of a communication and polling sequence of a data collection and RF data communications system, including a portable data reader, according to a first method of data communications of the present invention.
Figure 6B:
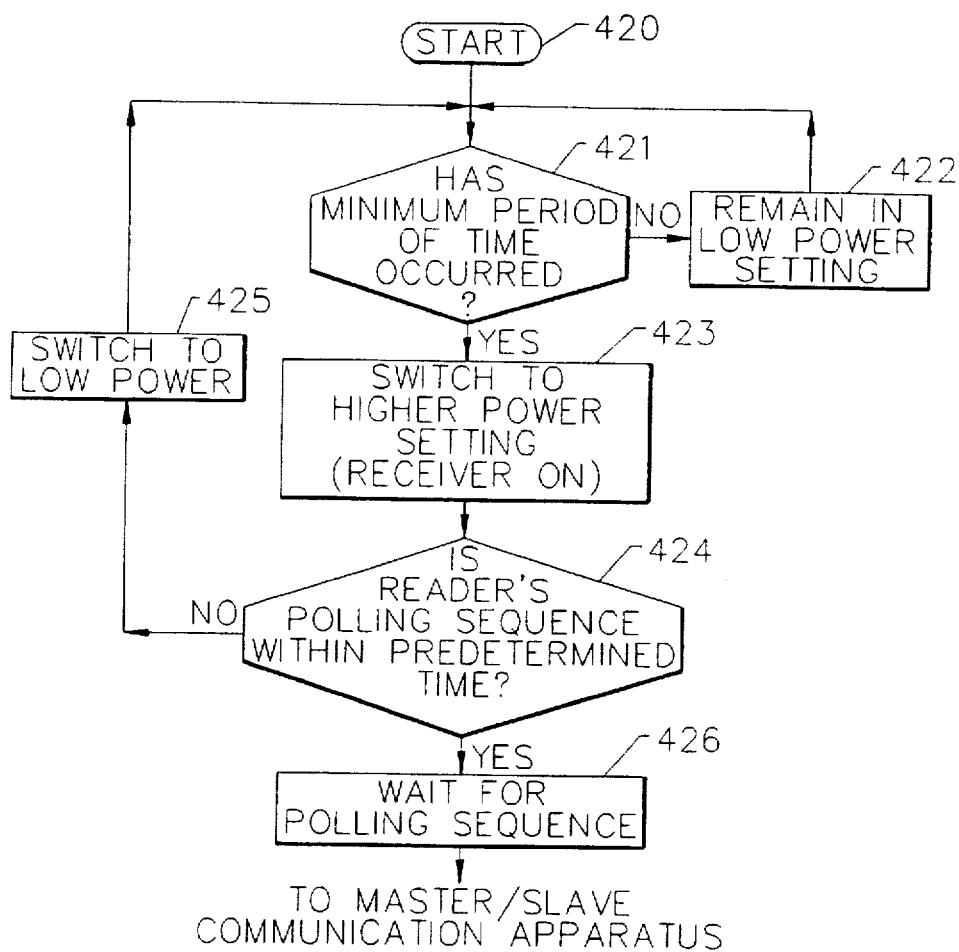

FIGS. 6A–6B schematically illustrate a flow chart of a communication and polling sequence of a data collection and RF data communications system 15 including a portable data reader, according to a first method of data communications of the present invention. As understood by those skilled in the art, this operational communication sequence is preferably implemented in a combination of hardware and software positioned in and connected to the data reader 20 and the data communication apparatus 150 which preferably includes the master station 200, the satellite stations 205, 206, 225, 226, and the slave stations 220, 230, 240, 280.

As illustrated in FIGS. 5–6B, the data reader 20 initiates communication, i.e., logs onto the network, with the data communication apparatus 150, i.e., master station 200 (block 401). The master station 200 assigns a user identifying number as described above and polling sequence to the reader 20 (block 402). The master station 200 transmits this assignment data to the reader 20 (block 403), and the reader acknowledges receipt of this data (block 404). The master station 200 then initiates or includes the reader 20' in an existing polling sequence transmitted to the plurality of readers 20 (block 406) which preferably last no longer than about 20 ms. If the data reader 20 fails to acknowledge the polling thereof (block 406), then the next reader 20 in the polling sequence is polled (block 419). If the reader 20 acknowledges the polling but does not have data for the master station 200 (block 407), then the reader 20 determines whether the master station 200 has data for the reader 20 (block 414).

If the master station does not have data for the reader, then the reader switches to lower power for a predetermined time (block 418). This lower power mode preferably includes switching the transceiver 80 to an off-state wherein relatively no current is supplied thereto, from a transmitting and receiving state where a current of about 12–20 mA is supplied thereto depending on the transmitting or receiving states (see FIG. 6B). If the master station 200 does have data for the reader, then the master station sends the data (block 415), and a determination is made whether the polling window, i.e., a time of about 120 ms, has elapsed (block 416). If the polling window has elapsed, then the reader switches to the lower power state (block 418) and waits for the next sequence. If this window has not elapsed, the transmission from the master station is completed (block 417) and the power then switched.

If the reader 20 does have data for the master station 200, then the reader acknowledges (block 408) and transmits the data thereto via the RF link (block 409). A determination is made whether the polling window has elapsed, i.e., preferably a time of about 120 ms (block 410), and if so, the reader switches to lower power (block 418), the master station 200 polls the next reader (block 419), and the previous reader waits until the next polling sequence to transmit additional data. If the window has not elapsed, then completion of the data transmission is determined (block 411), the master station 200 acknowledges the completed transmission (block 412), and the reader then switches to the lower power (block 413).

During a next polling sequence for the same reader 20, as shown by the data reader entering the flow diagram between blocks 406 and 407, the reader switches to a higher power setting to listen for the poll. As illustrated in FIG. 6B, the reader 20 may make a determination based on the number of readers in the polling sequence and a predetermined time of each poll and each data transmission of other readers (blocks 420, 421) and switch to the higher power (block 423) or remain in the lower power state (block 422). If the reader 20 is switched to this higher power state, then from the other parameters of the network, it can determined if its polling sequence is within a predetermined time (block 424). If not, then it switches to the lower power state (block 425) and waits again. If the polling sequence is soon, then it can remain in the higher power state and wait for the polling sequence (block 426) as illustrated. Because the system 15 of the invention is designed so as to transmit only minimum amounts of information, less processing and less power are also required for the remote portable data readers 20.

Figure 6D:
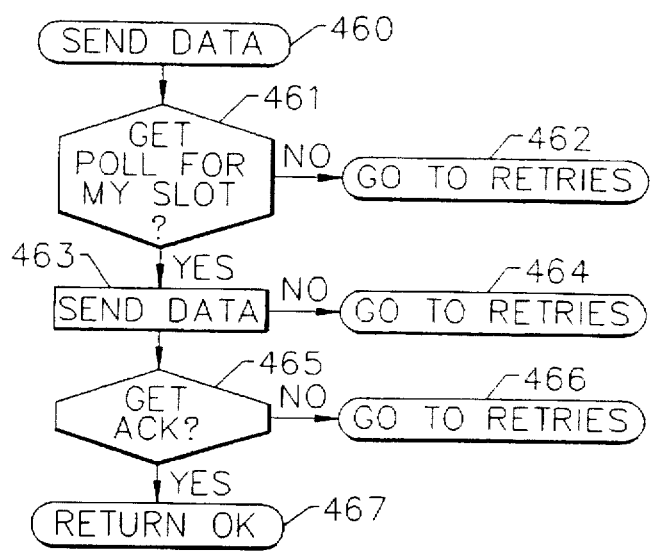
Figure 6E:
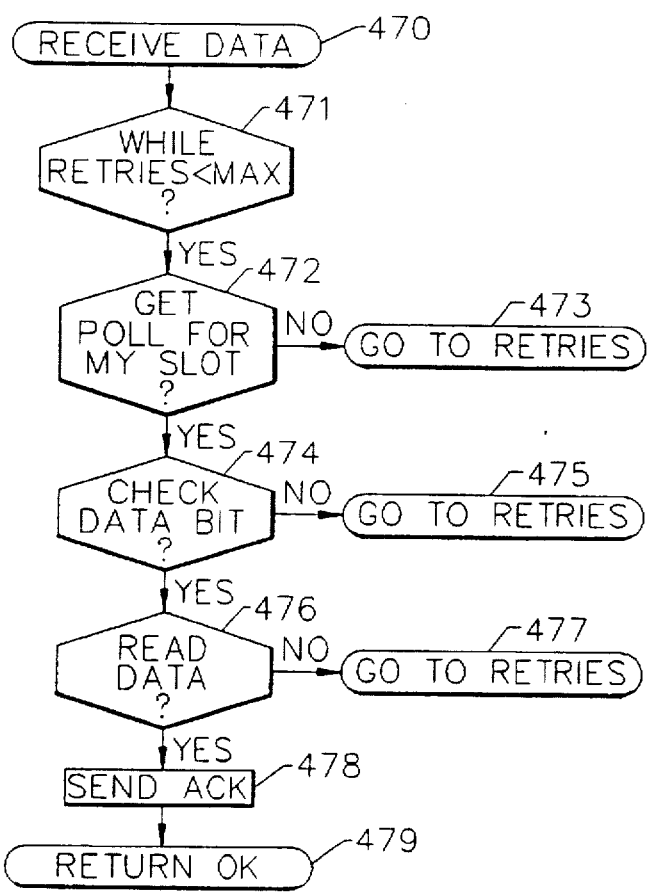

FIGS. 6C–6E schematically illustrate a flow chart of a communication and polling sequence of a data collection and RF data communications system 15 including a portable data reader 20, according to a second and preferred method of data communications of the present invention. As understood by those skilled in the art, this operational communication sequence also is preferably implemented in a combination of hardware and software positioned in and connected to the data reader 20 and the data communication apparatus 150 which preferably includes at least the master station 200 and, if needed, the satellite stations 205, 206, 225, 226, and/or the slave stations 220, 230, 240, 280.

In this embodiment as illustrated (blocks 440–490), the master station or command base station 200 listens for a data for a slot (block 440). If data is being received, then a data bit is set and the slot is polled. Then the following flow occurs in a switch scheme as understood by those skilled in the art. If no response occurs from the polling, then the next slot is polled. If data is requested from the reader 20, then data is sent, an acknowledgment is transmitted after receiving data, the data is deleted if not needed and the scheme move to the next slot. If data is received, then an acknowledgment is sent, data is transmitted to the host computer 150, and the scheme moves to the next slot. If a logoff occurs, then an acknowledgment is sent, the host computer 150 is notified, the slot is deleted, and the scheme moves to the next slot. If a login occurs, then a determination of whether the slot is zero is made, a new slot is assigned if so, and the slot assignment is transmitted to the reader or terminal 20. If no, then the next slot is selected. The host computer 150 is then notified.

For the reader 20, as illustrated in FIG. 6D, looks for a poll for its slot to send data to the master station 200. If not available, then an error message is transmitted, but if available, then data is transmitted. The reader 20 determines if an acknowledgment is received. If yes, then return is verified. If not, then a error message is transmitted. Upon receiving data, the reader 20 determines whether the reattempt or retries selection are less than a predetermined maximum. If yes, then a poll is received for the data slot. The data bit is checked or verified and the data is read. If successful, then an acknowledgment is transmitted or sent and the transaction completed, i.e., return okay. If unsuccessful in any of these attempts, then it retries until the predetermined maximum retries are reached.

FIGS. 2A–4B illustrate the remote RF portable data reader 20, the master/command base station 200, and the host computer 150 of a data collection and RF data communication system 15 according to the present invention. The data communications system 15 for collecting data from a remote data collection apparatus such as the RF portable data reader 20 preferably includes at least a first computer, i.e., host computer 150, including at least a first processor 180, preferably a central processing unit ("CPU") such as a microprocessor as understood by those skilled in the art, for processing data (FIG. 3A). A first screen display 151 is positioned in electrical communication with the first processor 180 for displaying data, and a first user interface 155, i.e., a keyboard, is positioned in electrical communication with the first processor 180 and adjacent the first screen display 151. The first user interface 151 is responsive to interaction with a user thereof. The first computer 150 also preferably has a base housing 152 and one or more disk drives 153a, 153b or other means for loading software and other data onto the memory circuits or a disk associated with the computer 150.

Figure 4A:
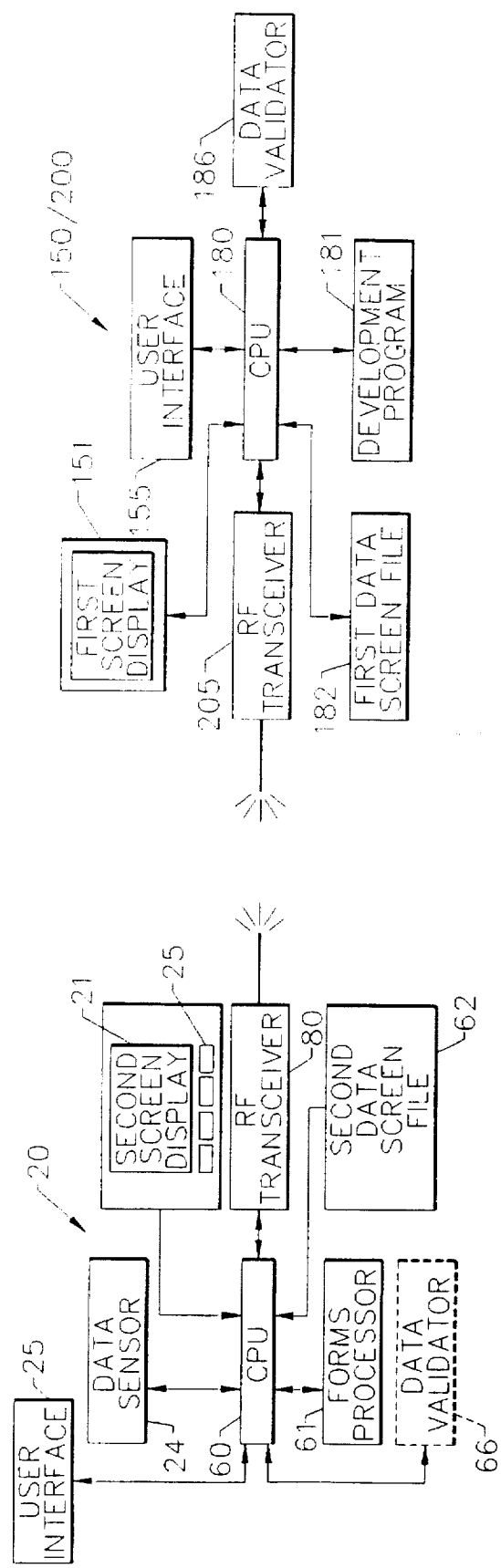
FIG. 4A schematically illustrates a portable data reader and a master station/host computer each having data screen format files of a data collection and RF data communications system according to the present invention.
Figure 4B:
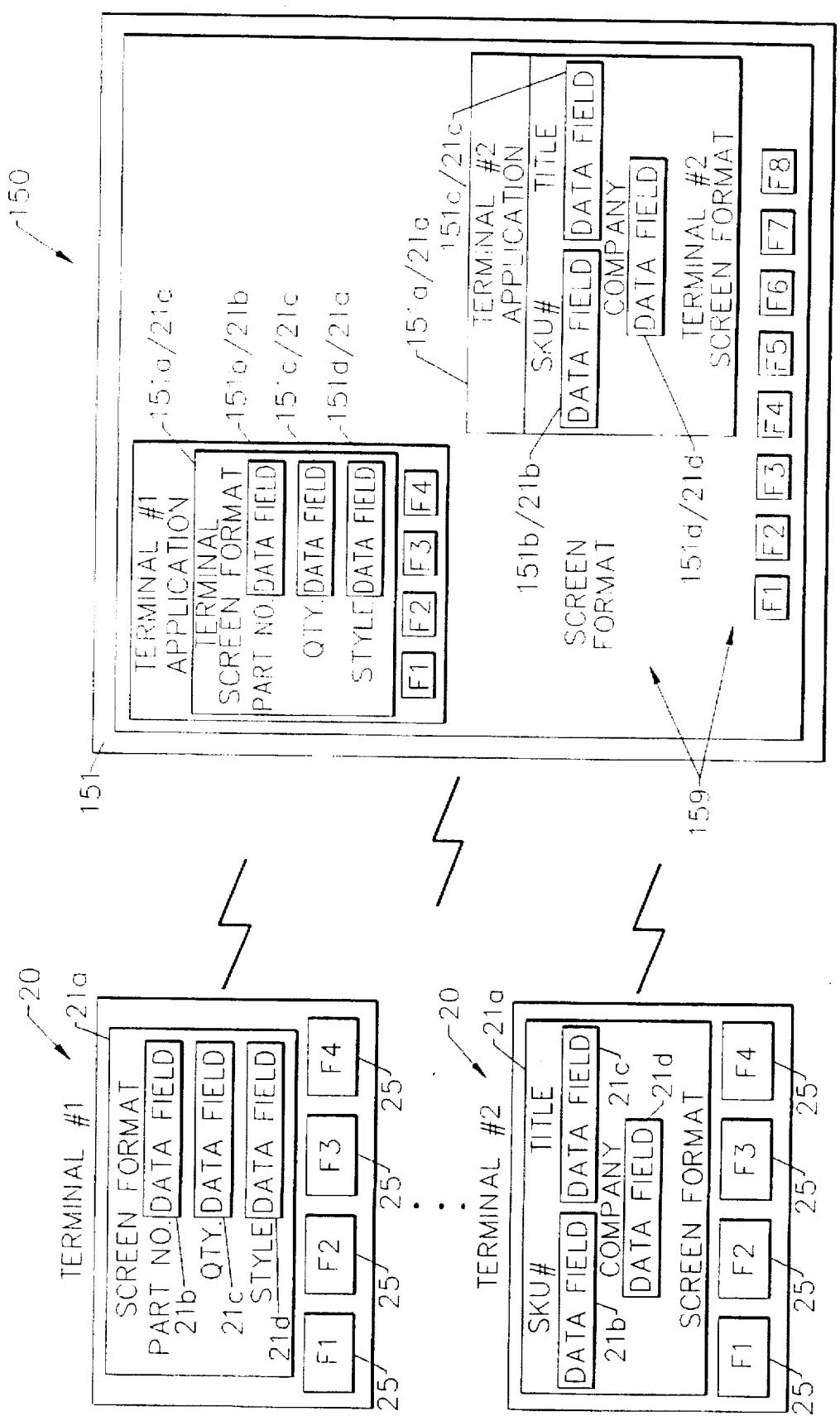
FIG. 4B schematically illustrates a plurality of portable data readers each having a data screen format file representing a predetermined data screen format and a host computer having a plurality of data screen format files each substantially corresponding to a data screen format file of a portable data reader according to the present invention.

As best illustrated in FIGS. 4A and 4B, a first data screen file 182 is positioned in electrical communication with the first processor 180 and represents a first predetermined screen display format, e.g., 151a, 159, having a plurality of predetermined data fields 151b, 151c, 151d. The plurality of predetermined data fields 151b, 151c, 151d of the first predetermined screen format preferably define at least a first application form. The first computer 150 preferably includes means for modifying the first data screen file, preferably including the first user interface. A first RF data transceiver, i.e., RF input/output source 205 of the master station 200, is positioned in electrical communication with the first processor 180 of the first computer 150 for transmitting and receiving RF data, i.e., bidirectional data transfer. A second RF data transceiver 80, i.e., RF I/O source of the portable data reader 20, is positioned remote from the first RF data transceiver 205 and the first computer 150 for transmitting RF data to and receiving RF data from the first RF data transceiver 205.

A second portable computer, i.e., portable data reader 20, is positioned in electrical communication with the second RF data transceiver 80 and remote from the first computer 150. Additionally, the means for modifying the first data screen file of the first computer 150 may include a user interface, and preferably in combination with a software application program such as Visual Basic by Microsoft Corporation, as illustrated positioned in electrical communication with the first processor for receiving user input data from a user of the first computer 150 whereby the user input data is responsively transmitted from the first transceiver of the first computer 150 to the second transceiver of the second computer 20 for developing and/or modifying applications for RF format.

As best illustrated in FIGS. 2B–2C and 3A–3B, the portable data reader 20, i.e., second computer, is arranged for collecting data remote from the first computer 150 and preferably includes a housing 22 being sized to be readily positioned in the hand of a user and a data sensor 24 connected to the housing for sensing data such as bar code, multi-dimensional code, optical character recognition, or the like. A second microprocessor 60, i.e., central processing unit, is positioned within the housing 22 and electrically connected to the data sensor 24. The second microprocessor 60 preferably is adapted for processing and decoding the sensed data or other data entered by the second user interface 50 such as the keyboard or the keys illustrated.

A second screen display 21 is connected to the housing 22 and is positioned in electrical communication with the second microprocessor 60. As understood by those skilled in the art, the second screen display 21 is adapted for displaying data to a user. A second user interface 50, i.e., preferably including the keyboard 25 as illustrated, is connected to the housing 22 and is preferably positioned adjacent the second screen display 21 and in electrical communication with the second microprocessor 60. The user interface 50 is responsive to interaction with a user such as when collecting data during an application or when communicating with the control manager at the host computer 150. Also, in the system 15, the first computer preferably includes means positioned in electrical communication with the first processor and the first data screen file for modifying the first data screen file so that the first data screen file responsively modifies the first data screen format, and wherein the second computer is arranged for responsively receiving the modifications made to the first data screen file 182 and responsively modifies the second screen file 62 so that the modifications made to the first data screen file 182 are correspondingly and responsively displayed on the second screen display 21. The means for modifying the first data screen file 182 preferably is the first user interface, i.e., a keyboard, but may be or include other user interfaces such as a mouse, function keys, touchscreens, or the like, in combination with a software application development program, preferably such as Visual Basic of Microsoft Corporation which is hereby incorporated herein by reference in its entirety. As understood by those skilled in the art, the software application development program preferably is loaded into memory of the first computer 150 for user interaction therewith.

The second RF data transceiver 80 preferably is connected to the housing 22, has portions positioned therein, and is positioned in electrical communication with the second microprocessor 60 for transmitting data from and receiving data to the portable data reader 20, i.e., bidirectional data transfer. A timer 75 is positioned within the housing 22, is positioned in electrical communication with the second microprocessor 60, and is adapted for providing timing signals thereto. A portable power source 70, i.e., battery, is positioned within the housing 22 and is positioned in electrical communication with the data sensor 24, the second microprocessor 60, the second screen display 21, the second user interface 50, the second RF data transceiver 80, and the timer 75 for supplying power thereto.

As described in more detail in copending U.S. patent application Ser. No. 08/324,980 filed on Oct. 18, 1994 which is hereby incorporated herein in its entirety by reference, a power manager 100 is positioned within the housing and in electrical communication with the portable power source 70, the data sensor 24, the second microprocessor 60, the second screen display 21, the user interface 50, and the second RF data transceiver 80. The power manager 100 is adapted to manage the amount of and timing of power supplied to the various power using components of the portable data reader 20, e.g., the data sensor 24, the second microprocessor 60, the second screen display 21, and the second RF transceiver 80, responsive to command signals from the second microprocessor 60 and interaction of a user with the user interface 50 to thereby substantially extend the time period required before replacing or recharging the portable power source 70. The power manager 100 preferably provides at least three modes of predetermined power operation of the second microprocessor 60, the second screen display 21, and the second user interface 50. The first power mode preferably has the second microprocessor 60 inactive, the second screen display 21 off, and the second user interface 50 inactive. The second power mode preferably has the second microprocessor 60 inactive, the second screen display 21 on, and the second user interface 50 active. The third power mode preferably has the second microprocessor 60 active, the second screen display 21 on, and the user interface 50 active.

The portable data reader 20 also preferably includes a second data screen file 62 positioned in electrical communication with the second microprocessor 60 and represents a second predetermined screen display format 21a having a plurality of predetermined data fields 21b, 21c, 21d. The plurality of predetermined data fields 21b, 21c, 21d of the second predetermined screen format 21a preferably define a second application form substantially corresponding to the first application form so that modifications to the first data screen file 182 are responsively made to the first application form and to the second data screen file 62 which responsively displays the modifications as the second application form on the second screen display 21 substantially in the first screen display format 151a to a user of the portable data reader 20. Preferably, the data sensed by the data sensor 24 of the second computer 20 is displayed on the second screen display 21 in at least one of the plurality of data fields 21b, 21c, 21d of the second computer 20 and correspondingly is displayed on the first screen display 151 in at least one of the plurality of data fields 151b, 151c, 151d of the first computer 150.

As best illustrated again in FIG. 1, a data collection and RF data communications system 15 according to the present invention may have a plurality of users wherein the second portable remote computer 20 described herein is only one of a plurality of remote portable computers 20 positioned remote from the first computer 150 and arranged for data collection and RF data communications with the first computer 150. Each of the plurality of remote portable computers 20 preferably include at least a microprocessor 60, a data sensor 24 positioned in electrical communication with the microprocessor 60 for sensing bar code data, a liquid crystal screen display 21 positioned in electrical communication with the microprocessor 60, and a data screen file 62 positioned in electrical communication with the microprocessor 60 and representing a predetermined screen display format 21a having a plurality of predetermined data fields 21b, 21c, 21d.

As best illustrated in FIG. 4B, preferably each of the screen data files 62 of the plurality of portable remote computers 20 substantially correspond to the first data screen file 182 so that each of the screen display formats 21a of the plurality of remote portable computers 20 substantially correspond to the first screen display format 151a, e.g., like a window format as understood by those skilled in the art, and so that modifications to the first data screen file 182 are responsively and synchronously made to each of the data screen files 62 of the plurality of remote portable computers 20 and responsively displayed on each of the liquid crystal screen displays 21 of the plurality of remote portable computers 20 to users thereof. The first predetermined screen format 182 of the first computer 150 defines a plurality of predetermined application forms, and each of the plurality of predetermined data fields of each of the predetermined screen formats 21a of the plurality of remote portable computers 20 define a predetermined application form of the remote portable computer 20.

Each of the predetermined applications forms of the plurality of remote portable computers 20 substantially correspond to one of the plurality of application forms of the first computer 150 so that modifications to one of the plurality of application forms of the first computer 150 such as by a control manager or applications programmer correspondingly modifies the predetermined application form of the remote portable computer 20. Additionally, a data field validator 186 preferably is positioned in electrical communication with the first microprocessor of the first computer for responsively validating, checking, and/or sequencing data received into one of the plurality of data fields of the second computer. A second data field validator 66 may also be positioned in electrical communication with the second microprocessor 60 of the portable data reader 20 for responsively validating, checking, and/or sequencing data received into one of the plurality of data fields 21b, 21c, 21d of the second computer 20 without required communication with the host computer 150.

As best illustrated in FIGS. 3A–7E, the present invention also provides a method of developing an RF data collection application. The method preferably includes providing a first computer 150 including a first screen display 151 for displaying data and a first data screen file 182 positioned in electrical communication with the first screen display 151. The first data screen file 82 representing a first predetermined screen display format 151a having a plurality of predetermined data fields 151b, 151c, 151d. The first data screen file 182 can then be modified such as by an application programmer, administrator, control manager, or the like so that the first data screen file 182 responsively modifies the first data screen format 151a.

A second computer 20, i.e., preferably a portable data reader, is provided and is positioned remote from and in RF communication with the first computer 150 and arranged for collecting data remote from the first computer 150. The portable data reader 20 preferably includes a data sensor 24 for sensing data, a second screen display 21 for displaying sensed data, and a second data screen file 62 positioned in electrical communication with the second screen display 21 and representing a second predetermined screen display format 21a having a plurality of predetermined data fields 21b, 21c, 21d. The second data screen file 62 substantially corresponds to the first data screen file 182. The modifications to the first data screen file 182 made by control manager or the like are then transmitted to the second computer 20 by RF communications, and the portable data reader receives the modifications made to the first data screen file 182 from the first computer 150 by RF communications. The second screen data file 62 then is modified responsive to the modifications received by the second computer 20, i.e. download from host computer 150, so that the modifications made to the first data screen file 182 are correspondingly and responsively displayed on the second screen display 21.

The plurality of predetermined data fields 151b, 151c, 151d of the first predetermined screen format 151a of the first computer 150 define at least a first application form, and the plurality of predetermined data fields 21b, 21c, 21d of the second predetermined screen format 21a of the second computer 20 define a second application form substantially corresponding to the first application form so that modifications to the first application form synchronously modifies the second application form.

The portable data reader 20 can then sense data by the data sensor 24, display the sensed data on the second screen display 21 in at least one of the plurality of data fields 21b, 21c, 21d of the second computer 20, and correspondingly display the sensed data on the first screen display 151 in at least one of the plurality of data fields 151b, 151c, 151d of the first computer 150. Because of the desirability of low power operations of the portable data reader 20, power can be supplied from the portable power source 70 to the power supply circuit 110 (see FIGS. 3A–3B). The power supply circuit 110 preferably is responsive to predetermined commands from the second microprocessor 60. Predetermined commands from the second processor 60 are supplied to the power supply circuit 110 responsive to command signals received from the memory circuit 115, the timer 75, and user interaction with the user interface 50 of the portable data reader 20. These predetermined commands responsively allow only a predetermined level of power from the power supply circuit 110 to be supplied to the second microprocessor 60, the second screen display 21, the user interface 50, and the data sensor 24 to more effectively manage the power usage requirements of the portable data reader 20.

FIGS. 7A–7D schematically illustrate a flow diagram of a development process 300 of an application for a data collection and RF data communications system 15 according to the present invention. Either during use or during non-use of a portable data reader 20, an application modification is initiated (block 320). For example, an application control manager modifies the first data screen file 182 of the host computer 150 (block 312). The portable data reader 20 is turned on and responsively requests the user's name/password data (block 302). As previously described with respect to the polling sequence, the user password data is tagged with terminal identifying data (block 303). The portable data reader 20 then transmits (block 304) and the host computer 150 receives the tagged data (block 305). The host computer 150 preferably validates, checks, and/or sequences the received data (block 306) and determines whether the user name/password identifying data is on file (block 307). If the user or password is not on file, for example, then an error message is transmitted by RF communications (block 308), received by the portable data reader 20 (block 309), and the process repeated.

If the user/password identifying data is on file, however, then the host computer 150 determines whether the user has been assigned a predetermined menu/screen format (block 310). If not, then the error messages described above are sent to the reader. If an assignment has been made, then the host computer 150/master station 200 transmits the menu/screen format to the reader 20 for the user's application (block 311). The reader 20 preferably displays the menu/screen format on the screen display 21, but the displaying in this context could mean only transmitted to random access memory device or other memory in the reader 20 or in the host computer 150 (block 312). The user of the reader 20 selects the menu/screen format choice (block 313) and the selected choice is transmitted to and received by the master station 200/host computer 150 (blocks 314, 315).

Figure 7A:
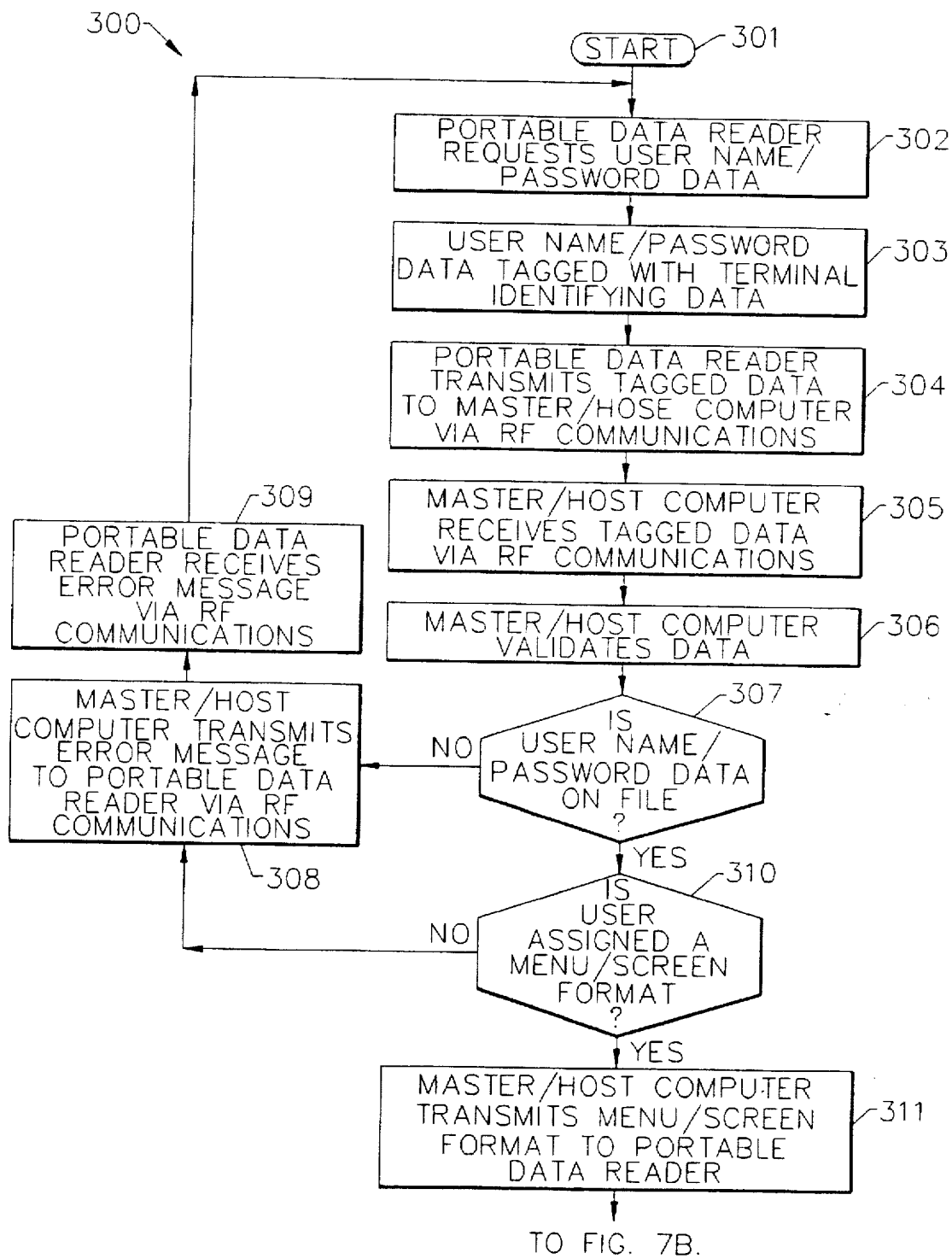
FIGS. 7A–7D schematically illustrate a flow diagram of a development modification process of an application for a data collection and RF data communications system according to the present invention.
Figure 7B:
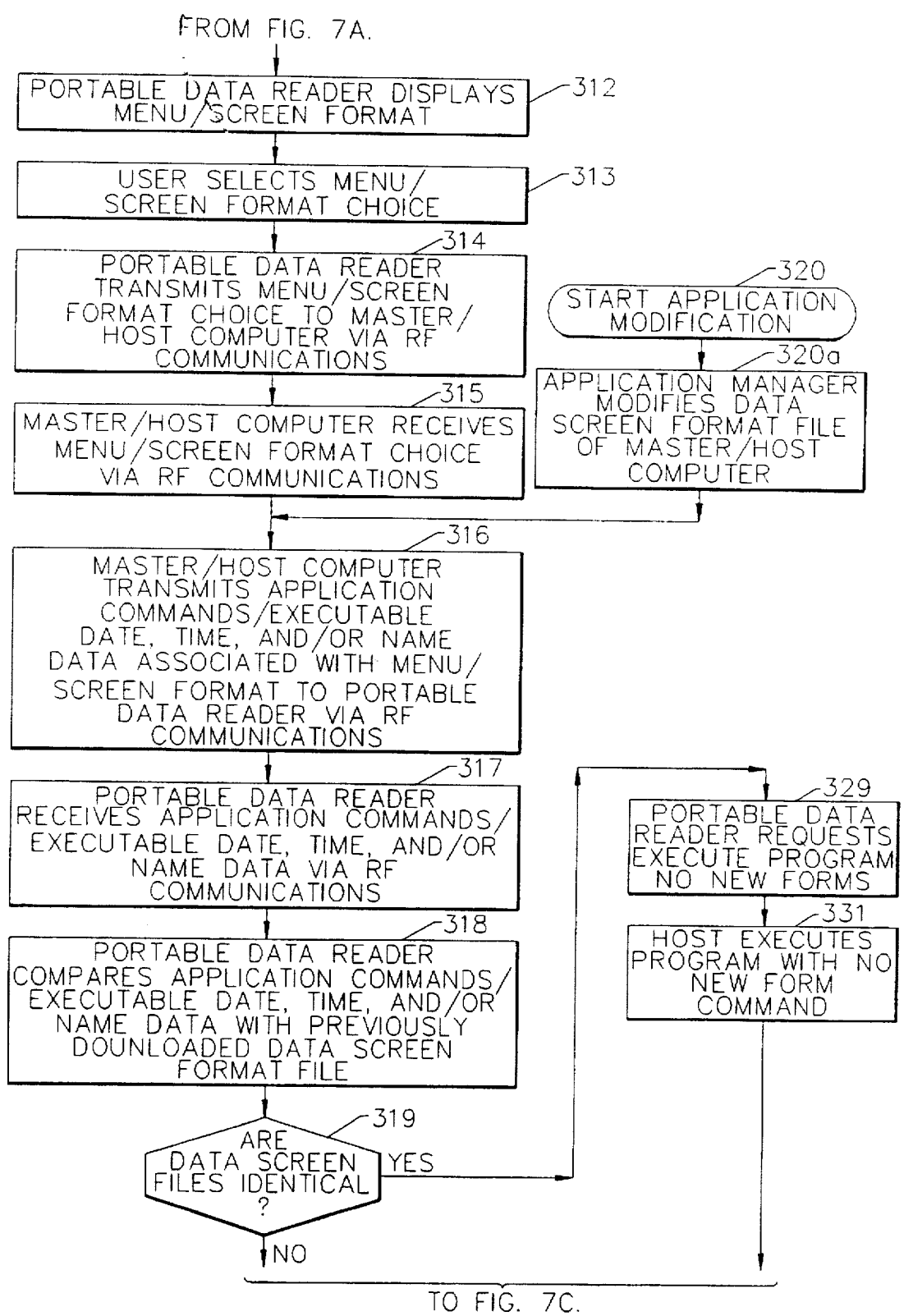
Figure 7C:
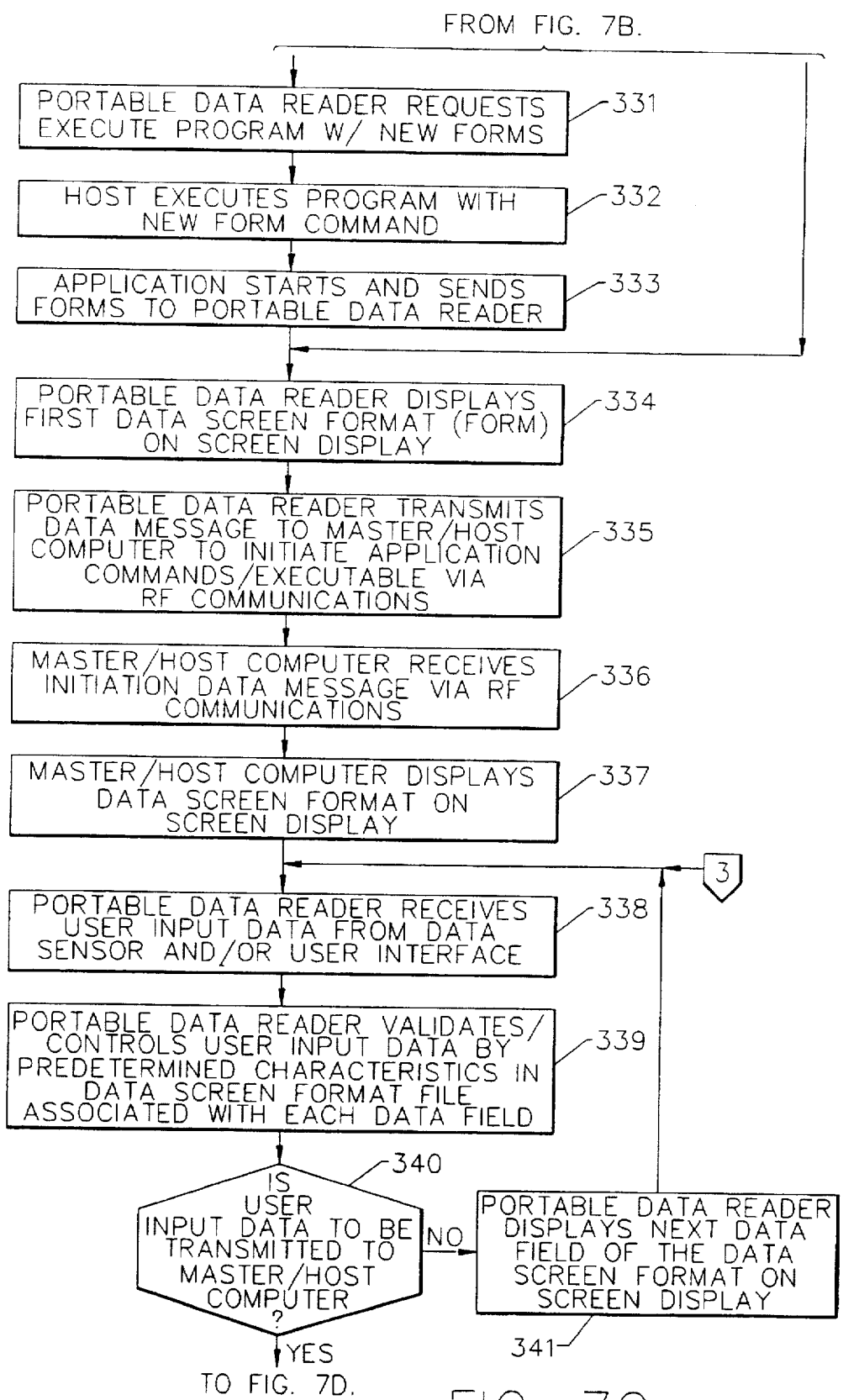
Figure 7D:
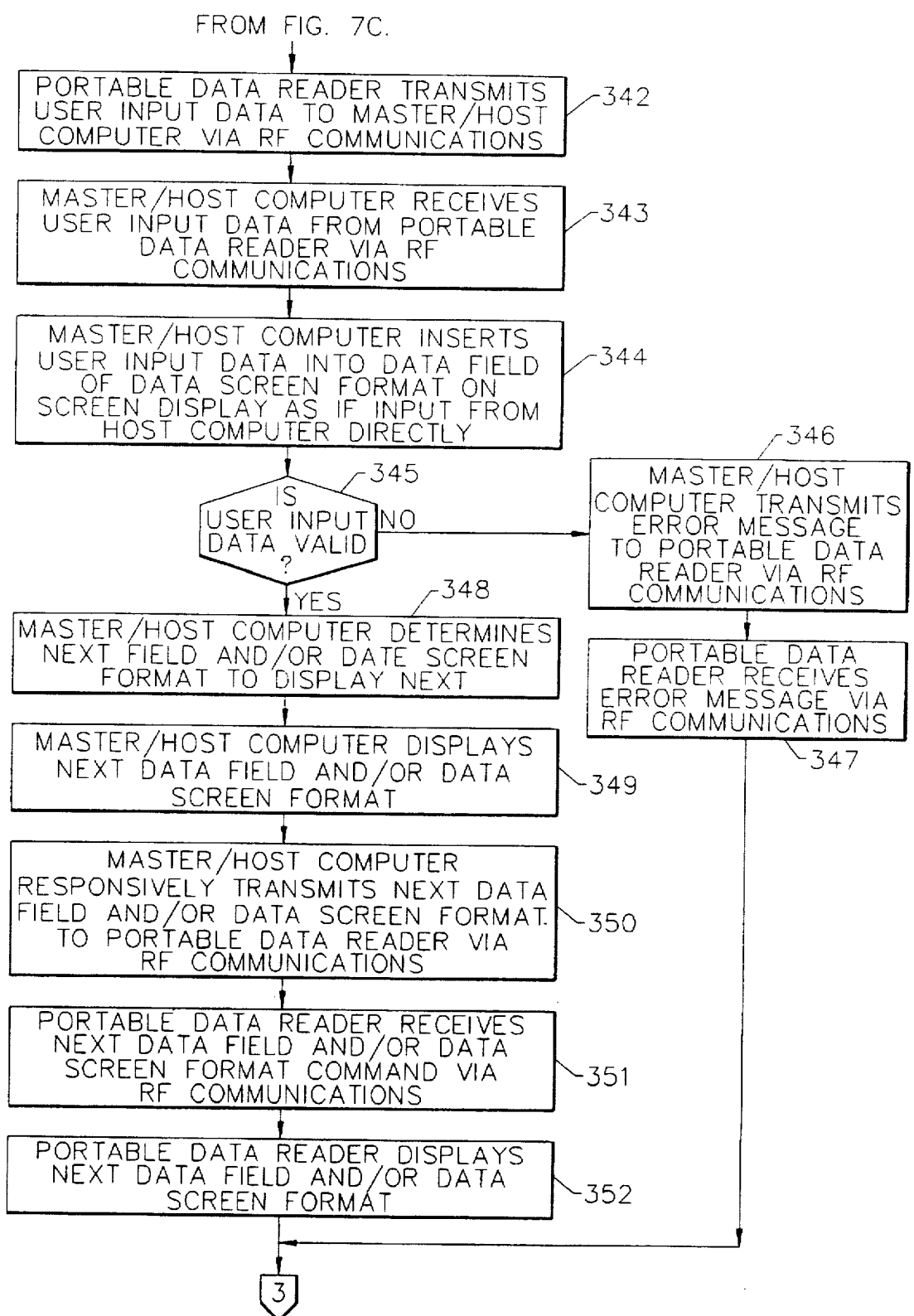

At this time, information about the application modification (block 320a as illustrated in FIG. 7B) such as the date and time of modification and/or the name of programmer or the like is transmitted to and received by the reader 20 (blocks 316, 317). The updating information is then preferably compared (block 318) and determined whether identical (block 319). If the compared data is identical, then the application format and/or files of the reader do not need to be updated and a request for the execute program occurs. The host computer 150, then executes the program with no new data screen display format or forms changes and proceeds to block 334 as illustrated. If the files 62, 182 are not identical, then the reader 20 requests the execute program with the updated or new data screen display formats or forms and are update by transmitting the request to and receiving the update from the host computer 150 (blocks 330, 331, 332, 333). The application starts and send the forms to the reader 20 and proceeds to block 334 as illustrated.

After the update occurs, if needed, the reader 20, displays the first data screen format, i.e., application form, on the second screen display 21 (block 334). The reader 20 initiates the application commands/executable by transmitting an initiation data message to and receiving the message by the host computer 150 (blocks 335, 336). The host computer 150 then preferably displays the first data screen format 151a on the first data screen display (block 337).

The reader 20 can then receive data from the data sensor 24 or the user interface 50 (block 338), and the data can be validated (block 339). If the user input data (block 340) is to be transmitted to the host computer, then an RF transmission occurs (blocks 342, 343) and the data inserted into a data field 151b of the data screen format as if input direct from the host computer (block 344), i.e., real time (see FIG. 7D). If the data is not to be transmitted immediately to the host computer, then the reader 20 displays the next field (block 341) and data may be input to the reader once again (block 338).

Once the user input data is inserted into a field 151b, 151c, 151d by the host computer, data validation preferably occurs (block 345). If the data is not valid, then an error message is transmitted to and received by the reader 20 (blocks 346, 347). If the data is valid, however, the host computer determines the next data field or data screen format to display (block 348). This next data field or format is displayed by the host computer 150 (block 349) and responsively transmitted to the reader 20 (blocks 350, 351). The reader then displays the next data field and/or data screen format required for the application, i.e., inventory control, tracking (block 352). The reader 20 is then ready for the next user input data (see block 338 of FIG. 7C).

Because conventional heavy-use systems many times are over developed and too expensive for many of the light-use applications in the industry, the system 15 and method of the present system addresses this problem. The conventional heavy-use systems are expensive, complex, and require extensive customizing of applications. In contrast, the present invention provides a less expensive, a less complex, and a relatively easier method of developing applications by users, i.e., using Visual Basic (a registered trademark of Microsoft Corp.) development software loaded onto the host computer 150 of a data collection and RF data communications system 15. By providing a data collection and RF data communications system 15 which is directed primarily to relatively light-use applications and which is relatively easy to program and modify by system users' for various applications, the present invention also advantageously saves users time and expense over these conventional heavy-use systems. The modified or new data collection applications developed for the system of the present invention preferably provides the change to a display screen format of a remote data collection device in real time and advantageously may be relatively transparent to the user thereof.

In the drawings and specification, there have been disclosed typical preferred embodiments of the invention and, although specific terms are employed, they are used in a descriptive sense only and not for purposes of limitation. The invention has been described in considerable detail with specific reference to these various illustrated embodiments. It will be apparent, however, that various modifications and changes can be made within the spirit and scope of the invention as described in the foregoing specification and as defined in the appended claims.

That which is claimed:

1. A radio frequency ("RF") data communications system for collecting data from a remote data collection apparatus, the RF data communications system comprising:

a first computer including at least a first processor for processing data, a first screen display positioned in electrical communication with said first processor for displaying processed data, and a first data screen file positioned in electrical communication with said first processor and representing a first predetermined screen display format having a plurality of predetermined data fields;

a first RF data transceiver positioned in electrical communication with said first processor of said first computer for transmitting and receiving RF data;

a second RF data transceiver positioned remote from said first RF data transceiver and said first computer for transmitting RF data to and receiving RF data from said first RF data transceiver;

a second computer positioned in electrical communication with said second RF data transceiver and remote from said first computer, said second computer being arranged for collecting data remote from said first computer and including at least a data sensor positioned for sensing data, a second processor positioned in electrical communication with said data sensor for processing sensed data, a second screen display positioned in electrical communication with said second processor for displaying sensed data, and a second data screen file positioned in electrical communication with said second processor and representing a second predetermined screen display format having a plurality of predetermined data fields, said second screen data file substantially corresponding to said first data screen file so that said second screen display format substantially corresponds to said first screen display format, wherein said first computer further comprises means positioned in electrical communication with said first processor and said first data screen file for modifying said first data screen file to represent a modified first data screen format having a plurality of predetermined data fields, wherein said first and second RF data transceivers transmit said modified first data screen file to said second computer which further comprises means for modifying said second data screen file to represent a modified second data screen format corresponding to the modified first data screen format and having a plurality of predetermined data fields, and wherein data sensed by said data sensor of said second computer fills at least one of the predetermined data fields of both said first and second predetermined screen display formats.

2. An RF data communications system as defined in claim 1, wherein said plurality of predetermined data fields of said first predetermined screen format of said first computer define at least a first application form, and wherein said plurality of predetermined data fields of said second predetermined screen format of said second computer define a second application form substantially corresponding to said first application form so that modifications to said first application form synchronously modifies said second application form.

3. An RF data communications system as defined in claim 2, wherein data sensed by said data sensor of said second computer is displayed on said second screen display and correspondingly is displayed on said first screen display of said first computer.

4. An RF data communications system as defined in claim 1, wherein said means for modifying said first data screen file of said first computer includes a user interface positioned in electrical communication with said first processor for receiving user input data from a user of said first computer whereby the user input data is responsively transmitted from said first transceiver of said first computer to said second transceiver of said second computer.

5. An RF data communications system as defined in claim 1, wherein said second computer further includes a power manager positioned in electrical communication with said second processor, said data sensor, and said second screen display for managing amount of power supplied to said second processor, said data sensor, and said second screen display during predetermined periods of usage of said second computer.

6. An RF data communications system as defined in claim 5, wherein said second computer further includes:

a housing being sized to be readily positioned in the hand of a user;

said data sensor being connected to said housing, said sensor being adapted for sensing data;

said second processor being a microprocessor positioned within said housing and electrically connected to said data sensor, said microprocessor being adapted for processing and decoding the sensed data;

said second screen display being connected to said housing and positioned in electrical communication with said microprocessor, said second screen display being adapted for displaying data to a user;

a user interface connected to said housing, and positioned adjacent said second screen display and in electrical communication with said microprocessor, said user interface being responsive to interaction with a user;

said second RF data transceiver being connected to said housing, having portions positioned therein, and positioned in electrical communication with said microprocessor for transmitting data from and receiving data to said second computer;

a timer positioned within said housing and in electrical communication with said microprocessor and adapted for providing timing signals thereto; and a portable power source positioned within said housing, said portable power source being positioned in electrical communication with said data sensor, said microprocessor, said second screen display, said user interface, said second RF data transceiver, and said timer and being adapted to supply power thereto, and wherein said power manager is positioned within said housing and in electrical communication with said portable power source, said data sensor, said microprocessor, said second screen display, said user interface, and said second RF data transceiver, said power manager being adapted to manage the amount of and timing of power supplied to said data sensor, said microprocessor, said second screen display, and said second RF transceiver responsive to command signals from said microprocessor and interaction of a user with said user interface to thereby substantially extend the time period required before replacing or recharging said portable power source, and wherein said power manager provides at least three modes of predetermined power operation of said second microprocessor, said second screen display, and said user interface, said first power mode having said microprocessor inactive, said second screen display off, and said user interface inactive, said second power mode having said microprocessor inactive, said second screen display on, and said user interface active, and said third power mode having said microprocessor active, said second screen display on, and said user interface active.

7. An RF data communications system as defined in claim 1, wherein said second computer comprises at least one of a plurality of remote computers positioned remote from said first computer and arranged for RF data communication therewith, each of said plurality of remote computers including at least a microprocessor, a data sensor positioned in electrical communication with said microprocessor for sensing data, a screen display positioned in electrical communication with said microprocessor, and a data screen file positioned in electrical communication with said microprocessor and representing a predetermined screen display format having a plurality of predetermined data fields, each of said screen data files of said plurality of remote computers substantially corresponding to said first data screen file so that each of said screen display formats of said plurality of remote computers substantially correspond to said first screen display format and so that modifications to said first data screen file are responsively and synchronously made to each of said data screen files of said plurality of remote computers and responsively displayed on each of said screen displays of said plurality of remote computers to users thereof.

8. A RF data communications system as defined by claim 7, wherein said first predetermined screen format of said first computer defines a plurality of predetermined application forms, and wherein each of said plurality of predetermined data fields of each of said predetermined screen formats of said plurality of remote computers define a predetermined application form of said remote computer, each of said predetermined applications forms of said plurality of remote computers substantially corresponding to one of said plurality of application forms of said first computer so that modifications to said one of said plurality of application forms of said first computer correspondingly modifies said predetermined application form of said remote computer.

9. An RF data communications system as defined in claim 1 further comprising a data field validator positioned in electrical communication with said first processor of said first computer for responsively validating data received into one of said plurality of data fields of said second computer, including data sensed by said data sensor of said second computer.

10. An RF data communications system as defined in claim 1, wherein said modifying means of said first computer includes a first user interface positioned in electrical communication with said first processor and adjacent said first screen display, said first user interface being responsive to interaction with a user of said first computer.

11. A radio frequency ("RF") data communications system for collecting data from a remote data collection apparatus, the RF data communications system comprising:

a first computer including at least a first microprocessor for processing data, a first screen display positioned in electrical communication with said first microprocessor for displaying data, a first user interface positioned in electrical communication with said first microprocessor and adjacent said first screen display, said first user interface being responsive to interaction with a user thereof, a modifiable first data screen file positioned in electrical communication with said first microprocessor and representing a first predetermined screen display format having a plurality of predetermined data fields, said plurality of predetermined data fields of said first predetermined screen format defining at least a first application form, and means positioned in electrical communication with said first processor and said first data screen file for modifying said first data screen file;

a first RF data transceiver positioned in electrical communication with said first microprocessor of said first computer for transmitting and receiving RF data;

a second RF data transceiver positioned remote from said first RF data transceiver and said first computer for transmitting RF data to and receiving RF data from said first RF data transceiver;

a second portable computer positioned in electrical communication with said second RF data transceiver and remote from said first computer, said second computer being arranged for collecting data remote from said first computer and including at least a data sensor for sensing data, a second microprocessor positioned in electrical communication with said data sensor for processing sensed data, a second screen display positioned in electrical communication with said second microprocessor for displaying data, and a second data screen file positioned in electrical communication with said second microprocessor and representing a second predetermined screen display format having a plurality of predetermined data fields, said plurality of predetermined data fields of said second predetermined screen format defining a second application form substantially corresponding to said first application form so that modifications to said first data screen file are responsively made to said first application form and to said second data screen file which responsively displays the modifications as said second application form on said second screen display in said first screen display format to a user thereof wherein data sensed by said data sensor of said second computer fills at least one of said plurality of data fields of both said first and second application forms, and wherein said RF data communications system further comprises a data field validator positioned in electrical communication with said first microprocessor of said first computer for responsively validating data filling at least one of said plurality of data fields of said second computer including data sensed by said data sensor of said second computer.

12. An RF data communications system as defined in claim 11, wherein data sensed by said data sensor of said second computer is displayed on said second screen display in at least one of said plurality of data fields of said second computer and correspondingly is displayed on said first screen display in at least one of said plurality of data fields of said first computer.

13. An RF data communications system as defined in claim 12, wherein said means for modifying said first data screen file of said first computer includes a user interface positioned in electrical communication with said first processor for receiving user input data from a user of said first computer whereby the user input data is responsively transmitted from said first transceiver of said first computer to said second transceiver of said second computer.

14. An RF data communications system as defined in claim 13, wherein said second portable computer further includes:

a housing being sized to be readily positioned in the hand of a user;

said data sensor being connected to said housing, said sensor being adapted for sensing bar code data;

said second microprocessor being positioned within said housing and electrically connected to said data sensor, said second microprocessor being adapted for processing and decoding the sensed bar code data;

said second screen display being connected to said housing and positioned in electrical communication with said second microprocessor, said second screen display being adapted for displaying data to a user;

a user interface connected to said housing, and positioned adjacent said second screen display and in electrical communication with said second microprocessor, said user interface being responsive to interaction with a user;

said second RF data transceiver being connected to said housing, having portions positioned therein, and positioned in electrical communication with said second microprocessor for transmitting data from and receiving data to said second computer;

a timer positioned within said housing and in electrical communication with said second microprocessor and adapted for providing timing signals thereto;

a portable power source positioned within said housing, said portable power source being positioned in electrical communication with said data sensor, said second microprocessor, said second screen display, said user interface, said second RF data transceiver, and said timer and being adapted to supply power thereto; and a power manager positioned within said housing and in electrical communication with said portable power source, said data sensor, said second microprocessor, said second screen display, said user interface, and said second RF data transceiver, said power manager being adapted to manage the amount of and timing of power supplied to said data sensor, said second microprocessor, said second screen display, and said second RF transceiver responsive to command signals from said second microprocessor and interaction of a user with said user interface to thereby substantially extend the time period required before replacing or recharging said portable power source, and wherein said power manager provides at least three modes of predetermined power operation of said second microprocessor, said second screen display, and said user interface, said first power mode having said second microprocessor inactive, said second screen display off, and said user interface inactive, said second power mode having said second microprocessor inactive, said second screen display on, and said user interface active, and said third power mode having said second microprocessor active, said second screen display on, and said user interface active.

15. An RF data communications system as defined in claim 11, wherein said second portable computer comprises at least one of a plurality of remote portable computers positioned remote from said first computer and arranged for data collection and RF data communication with said first computer, each of said plurality of remote portable computers including at least a microprocessor, a data sensor positioned in electrical communication with said microprocessor for sensing bar code data, a screen display positioned in electrical communication with said microprocessor, and a data screen file positioned in electrical communication with said microprocessor and representing a predetermined screen display format having a plurality of predetermined data fields, each of said screen data files of said plurality of remote computers substantially corresponding to said first data screen file so that each of said screen display formats of said plurality of remote portable computers substantially correspond to said first screen display format and so that modifications to said first data screen file are responsively and synchronously made to each of said data screen files of said plurality of remote portable computers and responsively displayed on each of said screen displays of said plurality of remote portable computers to users thereof.

16. A RF data communications system as defined by claim 15, wherein said first predetermined screen format of said first computer defines a plurality of predetermined application forms, and wherein each of said plurality of predetermined data fields of each of said predetermined screen formats of said plurality of remote portable computers define a predetermined application form of said remote portable computer, each of said predetermined applications forms of said plurality of remote portable computers substantially corresponding to one of said plurality of application forms of said first computer so that modifications to said one of said plurality of application forms of said first computer correspondingly modifies said predetermined application form of said remote portable computer.

17. A method of developing a radio frequency ("RF") data collection application, the method comprising:
   generating a first data screen file representing a first predetermined screen display format having a plurality of predetermined data fields in a first computer which includes a first screen display for displaying data and the first data screen file positioned in electrical communication with the first screen display;
   modifying the first data screen file so that the first data screen file responsively modifies the first data screen format;
   transmitting the modifications made to the first data screen file to a second computer by RF communications;
   receiving the modifications made to the first data screen file from the first computer by RF communications;
   modifying a second data screen file of the second computer in response to the modifications received by the second computer so that the modifications made to the first data screen file are correspondingly and responsively displayed on a second screen display in the second computer positioned remote from and in RF communication with the first computer and arranged for collecting data remote from the first computer, the second computer including a data sensor for sensing data, the second screen display for displaying sensed data, and the second data screen file positioned in electrical communication with the second screen display and representing a second predetermined screen display format having a plurality of predetermined data fields, the second data screen file substantially corresponding to the first data screen file;
   sensing data with the data sensor of the second computer; and
   filling at least one of the predetermined data fields of both the first and second predetermined screen display formats defined by the first and second data screen files, respectively.

18. A method as defined in claim 17, wherein the plurality of predetermined data fields of the first predetermined screen format of the first computer define at least a first application form, and wherein the plurality of predetermined data fields of the second predetermined screen format of the second computer define a second application form substantially corresponding to the first application form so that modifications to the first application form synchronously modifies the second application form.

19. A method as defined in claim 17, further comprising displaying the sensed data on the second screen display in at least one of the plurality of data fields of the second computer, and correspondingly displaying the sensed data on the first screen display in at least one of the plurality of data fields of the first computer.

20. A method as defined in claim 17, further comprising modifying the first data screen file of the first computer responsive to user input data from a user of the first computer, and responsively transmitting the user input data to the first transceiver of the first computer to the second transceiver of the second computer.

21. A method as defined in claim 19, wherein the second computer comprises a portable data reader which includes the data sensor, a processor, a memory circuit, the second screen display, a user interface, a timer, a portable power source, and a power supply circuit, the method further comprising:
   supplying power from the portable power source to the power supply circuit, the power supply circuit being responsive to the processor;
   supplying predetermined commands from the processor to the power supply circuit responsive to command signals received from the memory circuit, the timer, and user interaction with the user interface; and
   supplying a predetermined level of power from the power supply circuit to the processor, the display, the user interface, and the data sensor responsive to the predetermined commands supplied from the processor to the power supply circuit.

22. A method as defined in claim 17 further comprising responsively validating data received into one of the plurality of data fields of the second screen display of the second computer, including data sensed by the data sensor of the second computer.

23. A method of developing a radio frequency ("RF") data collection application, the method comprising:
   modifying a first data screen file representing a first data screen format of a first computer so that the first data screen file responsively modifies the first data screen format;
   transmitting updating information relating to modifications of the first data screen file to a second remote portable computer;
   determining if the first data screen file is different than a second data screen file maintained by the second remote portable computer based upon the updating information;
   transmitting the modifications made to the first data screen file to the second remote portable computer by RF communications if the first data screen file is different than the second data screen file maintained by the second remote portable computer;
   receiving the modifications made to the first data screen file from the first computer by RF communications; and
   modifying the second data screen file representing a second data screen format responsive to the modifications received by the second remote portable computer so that the modifications made to the first data screen file are correspondingly and responsively displayed on a second screen display to a user of the second computer.

24. A method as defined in claim 23, wherein the first data screen format of the first computer includes a plurality of predetermined data fields which define at least a first application form, and wherein the second data screen format of the second remote portable computer includes a plurality of predetermined data fields which define a second application form substantially corresponding to the first application form so that modifications to the first application form synchronously modifies the second application form.

25. A method as defined in claim 24, further comprising sensing data by a data sensor of the second remote portable computer, displaying the sensed data on the second screen display in at least one of the plurality of data fields of the second remote portable computer, and correspondingly displaying the sensed data on a first screen display in at least one of the plurality of data fields of the first computer.

26. A method as defined in claim 25, wherein the second remote portable computer comprises a portable data reader which includes the data sensor, a processor, a memory circuit, the second screen display, a user interface, a timer, a portable power source, and a power supply circuit, the method further comprising:

supplying power from the portable power source to the power supply circuit, the power supply circuit being responsive to the processor;

supplying predetermined commands from the processor to the power supply circuit responsive to command signals received from the memory circuit, the timer, and user interaction with the user interface; and supplying a predetermined level of power from the power supply circuit to the processor, the display, the user interface, and the data sensor responsive to the predetermined commands supplied from the processor to the power supply circuit.

27. A method as defined in claim 25 further comprising responsively validating data received into one of the plurality of data fields of the second screen display of the second remote portable computer, including data sensed by the data sensor of the second remote portable computer.

* * * * *